(12) United States Patent
Sakai et al.

(10) Patent No.: US 9,019,451 B2
(45) Date of Patent: Apr. 28, 2015

(54) LIQUID-CRYSTAL DISPLAY DEVICE

(75) Inventors: Akira Sakai, Osaka (JP); Kazuyoshi Sakuragi, Osaka (JP); Masahiro Hasegawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 496 days.

(21) Appl. No.: 13/499,999

(22) PCT Filed: May 20, 2010

(86) PCT No.: PCT/JP2010/058547
§ 371 (c)(1),
(2), (4) Date: Apr. 3, 2012

(87) PCT Pub. No.: WO2011/043098
PCT Pub. Date: Apr. 14, 2011

(65) Prior Publication Data
US 2012/0200811 A1  Aug. 9, 2012

(30) Foreign Application Priority Data
Oct. 7, 2009 (JP) .................. 2009-233704

(51) Int. Cl.
*G02F 1/1335* (2006.01)
*G02F 1/13363* (2006.01)
(Continued)

(52) U.S. Cl.
CPC ...... *G02F 1/133514* (2013.01); *G02F 1/13363* (2013.01); *G02F 1/133371* (2013.01); *G02F 1/133634* (2013.01); *G02F 1/1393* (2013.01); *G02F 2001/133637* (2013.01); *G02F 2001/133638* (2013.01); *G02F 2202/40* (2013.01);
(Continued)

(58) Field of Classification Search
None
See application file for complete search history.

(56) References Cited

U.S. PATENT DOCUMENTS

2003/0071952 A1   4/2003  Yoshida et al.
2006/0203162 A1 * 9/2006  Ito et al. .................. 349/117
(Continued)

FOREIGN PATENT DOCUMENTS

EP   2083290        7/2009
EP   2083290 A1 *  7/2009
(Continued)

OTHER PUBLICATIONS

International Search Report for PCT/JP2010/058547 mailed Jul. 27, 2010.
(Continued)

*Primary Examiner* — Richard Kim
*Assistant Examiner* — Ryan Crockett
(74) *Attorney, Agent, or Firm* — Nixon & Vanderhye P.C.

(57) ABSTRACT

A liquid crystal display (LCD) device includes a birefringent layer that satisfies the relationship nx>ny≥nz and may be considered a first-class birefringent layer, a birefringent layer that satisfies the relationship nx<ny≤nz may be considered a second-class birefringent layer, and a birefringent layer that satisfies the relationship nx≅ny≥nz may be considered a third-class birefringent layer. The LCD may include a first polarizer, a first first-class birefringent layer whose in-plane phase difference is adjusted to a quarter wave, an LC cell, a second first-class birefringent layer whose Nz factor is substantially the same as the first first-class birefringent layer and whose in-plane phase difference is adjusted to a quarter wave, a second-class birefringent layer, and a second polarizer which may be stacked in this order.

11 Claims, 15 Drawing Sheets

(51) Int. Cl.
*G02F 1/1333* (2006.01)
*G02F 1/139* (2006.01)
*G02F 1/1337* (2006.01)

(52) U.S. Cl.
CPC ......... *G02F 2413/03* (2013.01); *G02F 2413/04* (2013.01); *G02F 2413/06* (2013.01); *G02F 2413/11* (2013.01); *G02F 2413/12* (2013.01); *G02F 2413/13* (2013.01); *G02F 2413/14* (2013.01); *G02F 2001/133541* (2013.01); *G02F 2001/133742* (2013.01); *G02F 2203/04* (2013.01); *G02F 2203/64* (2013.01); *G02F 1/133502* (2013.01); *G02B 1/118* (2013.01)

(56) References Cited

U.S. PATENT DOCUMENTS

| | | |
|---|---|---|
| 2006/0244884 A1 | 11/2006 | Jeon et al. |
| 2007/0076152 A1* | 4/2007 | Ito et al. .................. 349/117 |
| 2007/0159585 A1 | 7/2007 | Yoshida et al. |
| 2009/0207349 A1 | 8/2009 | Yoshimi et al. |
| 2009/0213313 A1* | 8/2009 | Iwamoto .................. 349/118 |
| 2011/0261297 A1 | 10/2011 | Yoshida et al. |

FOREIGN PATENT DOCUMENTS

| | | |
|---|---|---|
| JP | 2002-40428 | 2/2002 |
| JP | 2003-186017 | 7/2003 |
| JP | 2003-207782 | 7/2003 |
| JP | 2006-514754 | 5/2006 |
| JP | 2008-134587 | 6/2008 |
| JP | 2008-249915 | 10/2008 |
| JP | 2009-37049 | 2/2009 |

OTHER PUBLICATIONS

Z. Ge et al., "Wide-View Circular Polarizers for Mobile Liquid Crystal Displays", IDRC08, 2008, pp. 266-268.

* cited by examiner (a)

0 orientation in oblique direction (b)

45 orientation in oblique direction (c)

45 orientation in oblique direction

LIQUID-CRYSTAL DISPLAY DEVICE

This application is the U.S. national phase of International Application No. PCT/JP2010/058547 filed 20 May 2010 which designated the U.S. and claims priority to JP2009-233704 filed 7 Oct. 2009, the entire contents of each of which are hereby incorporated by reference.

TECHNICAL FIELD

The present invention relates to a liquid-crystal display device. More specifically, the present invention relates to a liquid-crystal display device of a VA (vertical alignment) mode that uses a circularly polarizing plate.

BACKGROUND ART

Liquid-crystal display devices are widely used as display devices for various information-processing devices including computers and television sets. In particular, TFT liquid-crystal display devices (hereinafter also referred to as TFT-LCDs) have become widespread and the market is expected to grow further. Consequently, there is demand for further improvements in image quality. Although a TFT-LCD will be taken as an example in the following description, the present invention is not limited to TFT-LCDs and is applicable to liquid-crystal display devices in general, including, for example, passive matrix liquid-crystal display devices and plasma address liquid-crystal display devices.

To date, the most widely used system for TFT-LCDs is a so-called TN (twisted nematic) mode in which liquid crystal with a positive dielectric anisotropy is aligned horizontally between substrates placed facing each other. The TN liquid-crystal display devices are characterized in that an alignment direction of liquid crystal molecules adjacent to one of the substrates are twisted 90° with respect to an alignment direction of liquid crystal molecules adjacent to the other substrate. The TN liquid-crystal display technology is an industrially mature technology and inexpensive manufacturing techniques have been established, but it is difficult for the TN liquid-crystal display devices to achieve high contrast ratios.

On the other hand, so-called VA liquid-crystal display devices are known in which liquid crystal with a negative dielectric anisotropy is aligned vertically between substrates placed facing each other. In VA liquid-crystal display devices, when no voltage is applied, since liquid crystal molecules are aligned in a direction substantially vertical to a substrate surface, a liquid crystal cell exhibits almost no birefringence or rotatory polarization, and consequently light passes through the liquid crystal cell almost without changing a polarization state of the liquid crystal cell. Therefore, if a pair of polarizers (linear polarizers) are placed above and below the liquid crystal cell such that absorption axes of the polarizers will be orthogonal to each other (hereinafter also referred to as cross-Nicol polarizers), an almost completely black display can be realized when no voltage is applied. When a voltage equal to or higher than a threshold voltage is applied (hereinafter simply referred to as "when a voltage is applied"), the liquid crystal molecules tilt and become substantially parallel to the substrate, exhibiting high birefringence and realizing a white display. Thus, the VA liquid-crystal display devices can easily achieve very high contrast ratios.

With such a VA liquid-crystal display device, if a tilt direction of the liquid crystal molecules when a voltage is applied is unidirectional, asymmetry appears in viewing angle characteristics of the liquid-crystal display device. To deal with this, multi-domain VA mode is widely used in which the liquid crystal molecules in the pixel are divided in terms of the tilt direction into multiple directions, for example, by devising the structure of pixel electrodes or providing protrusions or other alignment control means in the pixel. Regions of liquid crystal molecules differing in tilting orientation are also referred to as domains, hence the name "multi-domain VA mode" is also referred to as "MVA mode".

In the MVA mode, from the viewpoint of maximizing the transmittance in a white display state, the axial orientation of the polarizer is normally set to be at an angle of 45° from the tilting orientation of liquid crystal molecules when a voltage is applied. This is because if α(in rads) is the angle between the axes of the polarizers and slow axis of the birefringent medium, the transmittance is proportional to $\sin^2(2\alpha)$ when a birefringent medium is sandwiched between cross-Nicol polarizers. In a typical MVA mode, liquid crystal molecules can be divided in terms of tilting orientation into four domains: 45°, 135°, 225°, and 315°. In the MVA mode with division into four domains, schlieren orientation or orientation in unintended directions is often observed near domain boundaries or alignment element control means, resulting in loss of transmittance.

To solve this problem, VA liquid-crystal display devices that use circularly polarizing plates are being studied (see, for example, Patent Document 1). With such liquid-crystal display devices, when a birefringent medium is sandwiched between a left-handed circularly polarizing plate and a right-handed circularly polarizing plate which are orthogonal to each other, the transmittance does not depend on the angle between the axes of the polarizers and slow axis of the birefringent medium. Consequently, even when the tilting orientation of liquid crystal molecules is other than 45°, 135°, 225°, and 315°, desired transmittance can be secured as long as the tilt of the liquid crystal molecules can be controlled. Therefore, for example, the liquid crystal molecules may be tilted in all orientations with a circular protrusion provided in the center of the pixel or may be tilted in random orientations without controlling the tilting orientation. Herein, the VA mode that uses circularly polarizing plates is also referred to as a circularly polarized VA mode or circular polarization mode. On the other hand, the VA mode that uses linearly polarizing plates is also referred to as a linearly polarized VA mode or linear polarization mode. Also, as is well known, the circularly polarizing plate is typically made up of a combination of a linearly polarizing plate and quarter-wave plate.

Furthermore, a circularly polarizing plate is known to have an optical antireflection function as follows: since circularly polarized light has the property of changing chirality between right and left when the circularly polarized light is reflected off a mirror, or the like, light incident, for example, upon a left-handed circularly polarizing plate placed on a mirror is converted into left-handed circularly polarized light by being transmitted through the circularly polarizing plate, and light reflected off the mirror is converted into right-handed circularly polarized light, which, however, cannot be transmitted through the left-handed circularly polarizing plate. Being capable of preventing unnecessary reflection when a display device is viewed in bright environments such as outdoors, the optical antireflection function of the circularly polarizing plate is known to have the effect of improving a bright-room contrast ratio of display devices including VA liquid-crystal display devices. It is believed that the unnecessary reflection is caused mainly by metal wiring and the like for transparent electrodes and TFT elements in the display device. Unless the unnecessary reflection is prevented, even if a display device realizes an almost completely black display when viewed in dark-room environments, the quantity of light during black display becomes excessive when the display device is viewed in bright environments, resulting in a reduced contrast ratio.

As described above, the circularly polarized VA mode that uses circularly polarizing plates can provide the effects of improving transmittance and preventing unnecessary reflection, but liquid-crystal display devices of a conventional circularly polarized VA mode have low contrast ratios at oblique viewing angles, and have room for improvement in that sufficient viewing angle characteristics are not available. Under these circumstances, various techniques for improving viewing angle characteristics using a birefringent layer (phase difference film) have been proposed. For example, Patent Documents 1, 2, 3, and 4 disclose methods (A), (B), (C), and (D) below, respectively, and Non-patent Document 1 discloses method (E) below.

(A) Method using two quarter-wave plates that satisfy the relationship $nx>ny>nz$.
(B) Method using a combination of two quarter-wave plates that satisfy the relationship $nx>ny>nz$ and one or two second-class birefringent layers that satisfy the relationship $nx<ny\leq nz$.
(C) Method using a combination of two quarter-wave plates that satisfy the relationship $nx>nz>ny$ and a third-class birefringent layer that satisfies the relationship $nx=ny>nz$.
(D) Method using one or two half-wave plates in addition to the combination used in method (C).
(E) Method using a combination of two uniaxial quarter-wave plates (so-called A-plates) that satisfy the relationship $nx>ny=nz$), a third-class birefringent layer that satisfies the relationship $nx=ny>nz$, and a birefringent layer that satisfies the relationship $nx>nz>ny$.

CITATION LIST

Patent Document

[Patent Document 1] JP 2002-40428A
[Patent Document 2] JP 2009-37049A
[Patent Document 3] JP 2003-207782A
[Patent Document 4] JP 2003-186017A Non-Patent Document

[Non-patent Document 1] Zhibing Ge and 6 others, "Wide-View Circular Polarizers for Mobile Liquid Crystal Displays," IDRC08, 2008, p. 266-268

SUMMARY OF THE INVENTION

However, studies conducted by the inventor show that methods (A), (B), and (C) above still leave room for improvement in viewing angle characteristics. Also, methods (C), (D), and (E) above have room for improvement in that the methods require a high-cost, difficult-to-produce, biaxial phase difference film that satisfies the relationship $nx>nz>ny$ (satisfies the relationship $0<Nz<1$).

The inventor has conducted various studies to solve the above problem, paid attention to phase difference conditions of a birefringent layer between a pair of polarizers (a first polarizer and second polarizer) disposed in a cross-Nicol state, found that by appropriately placing a first-class birefringent layer that satisfies the relationship $nx>ny\geq nz$ (satisfies the relationship $Nz\geq 1.0$) and a second-class birefringent layer that satisfies the relationship $nx<ny\leq nz$ (satisfies the relationship $Nz\leq 0.0$) between the first polarizer and second polarizer, it is possible to maintain orthogonality of the first polarizer and second polarizer in oblique direction while maintaining orthogonality of the first polarizer and second polarizer in front direction, and proposed method (F) below (a "birefringent layer that satisfies the relationship $nx>ny\geq nz$" is defined herein as a first-class birefringent layer and a "birefringent layer that satisfies the relationship $nx<ny\leq nz$" is defined herein as a second-class birefringent layer). Furthermore, the inventor has found that the first-class and second-class birefringent layers can be produced in a simple and easy way using a material with appropriate intrinsic birefringence unlike a biaxial phase difference film controlled to satisfy $nx>nz>ny$ ($0<Nz<1$), and has applied for a patent earlier (AN 2008-099526).

(F) Method using a combination of two quarter-wave plates, a third-class birefringent layer that satisfies the relationship $nx=ny>nz$, a first-class birefringent layer that satisfies the relationship $nx>ny\geq nz$, and a second-class birefringent layer that satisfies the relationship $nx<ny\leq nz$.

However, the use of five or more birefringent layers (phase difference films) is suitable for method (F) above, and there is room for improvement in terms of manufacturing cost. Also, with method (F) above, whereas viewing angle characteristics can be improved by optimally designing an Nz factor (parameter that represents biaxiality) of two quarter-wave plates, under design conditions in which two general-purpose biaxial quarter-wave plates that satisfy the relationship $nx>ny\geq nz$ ($Nz\geq 1.0$) are used, there is room for improvement in the viewing angle characteristics.

Thus, the inventors have conducted further studies on a circularly polarized VA liquid-crystal display device that can be manufactured easily at low cost and can achieve high contrast ratios in a wide range of viewing angles. Consequently, the inventors have found that light leakage in a black display state can be reduced, thereby achieving high contrast ratios in a wide range of viewing angles if general-purpose biaxial quarter-wave plates that satisfy the relationship $nx>ny\geq nz$ are used as the two quarter-wave plates (first and second quarter-wave plates) needed for the circularly polarized VA mode, the Nz factors of the two quarter-wave plates are adjusted to be substantially the same, and a birefringent layer that satisfies the relationship $nx<ny\leq nz$ is placed between the second quarter-wave plate and second polarizer. Furthermore, the inventors have found that the first-class and second-class birefringent layers can be produced in a simple and easy way using a material with appropriate intrinsic birefringence unlike a biaxial phase difference film controlled to satisfy $nx>nz>ny$ ($0<Nz<1$), and have applied for a patent earlier (AN 2009-015927).

In this way, the inventors have conducted various studies on improvements of the viewing angle characteristics in the circularly polarized VA mode and found that with every technique studied, the phase difference conditions of birefringent layers are optimally designed only for short wavelengths (normally around 550 nm) and consequently there is room for improvement in that light leakage occurs at wavelengths other than design wavelengths during black display, causing a coloration phenomenon at oblique viewing angles. Especially if a high contrast ratio is achieved as in the case of the liquid-crystal display device described in the aforementioned patent application (AN 2009-015927), light leakage occurs at wavelengths other than design wavelengths at oblique viewing angles during black display, resulting in a coloration phenomenon. Incidentally, when the contrast ratio is low, i.e., when there is a large amount of light leakage during black display, coloration rarely occurs normally even if no special measures are devised.

The present invention has been made in view of the above circumstances and an object of the present invention is to provide a liquid-crystal display device that can achieve high contrast ratios in a wide range of viewing angles and reduce light leakage in wide ranges of viewing angles and wavelengths during black display.

DISCLOSURE OF THE INVENTION

The inventors have conducted various studies on a liquid-crystal display device that can achieve high contrast ratios in a wide range of viewing angles and reduce light leakage in wide ranges of viewing angles and wavelengths during black display, paid attention to perpendicular phase difference of a member between the two quarter-wave plates (first and second quarter-wave plates), and found that wavelength dispersion characteristics of the perpendicular phase difference of the member between the two quarter-wave plates affect coloration at oblique viewing angles during black display. Furthermore, the inventors have found that the light leakage at wavelengths other than design wavelengths when viewed at oblique viewing angles during black display can be reduced by increasing wavelength dispersion characteristics of the liquid crystal cell (and third-class birefringent layer) with respect to intrinsic wavelength dispersion characteristics ($\Delta n$) of a liquid crystal material after reducing light leakage in a black display state and thereby achieving high contrast ratios in a wide range of viewing angles by using general-purpose biaxial quarter-wave plates that satisfy the relationship $nx > ny \geq nz$ as the two quarter-wave plates, adjusting the Nz factors of the two quarter-wave plates to be substantially the same, and placing a birefringent layer that satisfies the relationship $nx < ny \leq nz$ between the second quarter-wave plate and second polarizer as described above. Having realized that this idea can beautifully solve the above problem, the inventors have arrived at the present invention.

That is, the present invention provides a liquid-crystal display device, in which when a birefringent layer that satisfies the relationship $nx > ny \geq nz$ is defined as a first-class birefringent layer, a birefringent layer that satisfies the relationship $nx < ny \leq nz$ is defined as a second-class birefringent layer, and a birefringent layer that satisfies the relationship $nx \cong ny \geq nz$ is defined as a third-class birefringent layer, the liquid-crystal display device comprising: a first polarizer; a first first-class birefringent layer (hereinafter also referred to as a "first quarter-wave plate") whose in-plane phase difference is adjusted to a quarter wave; a liquid crystal cell provided with a pair of substrates facing each other; a second first-class birefringent layer (hereinafter also referred to as a "second quarter-wave plate") whose Nz factor is substantially the same as the first first-class birefringent layer and whose in-plane phase difference is adjusted to a quarter wave; a second-class birefringent layer; and a second polarizer, all of which are stacked in this order, wherein an in-plane slow axis of the first first-class birefringent layer is at an angle of substantially 45° to an absorption axis of the first polarizer, an in-plane slow axis of the second first-class birefringent layer is substantially orthogonal to the in-plane slow axis of the first first-class birefringent layer, an absorption axis of the second polarizer is substantially orthogonal to the absorption axis of the first polarizer, an in-plane fast axis of the second-class birefringent layer is substantially orthogonal to the absorption axis of the second polarizer, and the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (1) and (2) below:

$$Rth\_all(B)/Rth\_all(G) > \Delta n\_LC(B)/\Delta n\_LC(G) \quad (1)$$

$$Rth\_all(R)/Rth\_all(G) < \Delta n\_LC(R)/\Delta n\_LC(G) \quad (2)$$

where if at least one third-class birefringent layer exists at least one of between the first first-class birefringent layer and the liquid crystal cell and between the liquid crystal cell and the second first-class birefringent layer, $Rth\_all(B)$, $Rth\_all(G)$, and $Rth\_all(R)$ represent values obtained by adding values of perpendicular phase difference of the third-class birefringent layer at wavelengths of 450 nm, 550 nm, and 650 nm to perpendicular phase difference of the liquid crystal cell at wavelengths of 450 nm, 550 nm, and 650 nm, respectively; and $\Delta n\_LC(B)$, $\Delta n\_LC(G)$, and $\Delta n\_LC(R)$ represent birefringence values of a liquid crystal material of the liquid crystal layer at wavelengths of 450 nm, 550 nm, and 650 nm, respectively.

As used herein, the term "polarizer" means an element that has a function to convert natural light into linearly polarized light and is synonymous with the terms "polarizing plate" and "polarizing film." The term "birefringent layer" means a layer that has an optical anisotropy and is synonymous with the terms "phase difference film," "phase difference plate," "optically anisotropic layer," "birefringent medium," and the like. In order to fully achieve the operation and effects of the present invention, the "birefringent layer" herein is such that one of the absolute value of in-plane phase difference R and absolute value of perpendicular phase difference Rth described later is 10 nm or above, and preferably 20 nm or above. Also, as described above herein the "first-class birefringent layer" is a birefringent layer that satisfies the relationship $nx > ny \geq nz$, the "second-class birefringent layer" is a birefringent layer that satisfies the relationship $nx < ny \leq nz$, and the "third-class birefringent layer" is a birefringent layer that satisfies the relationship $nx \cong ny > nz$, where nx and ny are principal indices of refraction in an in-plane direction for light with a wavelength of 550 nm while nz is a principal index of refraction in an out-of-plane direction (perpendicular direction) for light with a wavelength of 550 nm.

As used herein, the "in-plane phase difference R" is defined by $R = |nx - ny| \times d$ (in nm) when the principal indices of refraction of a birefringent layer (including the liquid crystal cell and quarter-wave plate) in the in-plane direction are defined to be nx and ny, the principal index of refraction in the out-of-plane direction (perpendicular direction) is defined to be nz, and the thickness of the birefringent layer is defined to be d. On the other hand, the "perpendicular phase difference Rth" is out-of-plane (in perpendicular direction) phase difference (in nm) defined by $Rth = (nz - (nx+ny)/2) \times d$. The term "quarter-wave plate" means a layer that has a substantially quarter-wave (137.5 nm to be exact, but may be any value between 115 nm and 160 nm, both exclusive) optical anisotropy with respect to light with a wavelength of at least 550 nm and is synonymous with a quarter-wave phase difference film and a quarter-wave phase difference plate.

The "in-plane slow axis (fast axis)" corresponds to a direction of principal dielectric axis (direction of x- or y-axis) that in turn corresponds to the principal index of refraction ns (nf) if the larger and smaller of the in-plane principal indices of refraction nx and ny are redefined to be ns and nf, respectively. Furthermore, the "Nz factor" is a parameter that represents the extent of biaxiality of a birefringent layer defined by $Nz = (ns - nz)/(ns - nf)$. Incidentally, a measuring wavelength for the principal index of refraction and for phase difference is assumed herein to be 550 nm unless otherwise noted. Even if birefringent layers have the same Nz factor, differences in an average index of refraction=(nx+ny+nz)/3 of the birefringent layers result in differences in effective phase difference of the birefringent layers at oblique incidence under the influence of an angle of refraction, complicating design principles. To avoid this problem, the Nz factor of each birefringent layer is calculated herein by standardizing the average index of refraction to 1.5 unless otherwise noted. Regarding a birefringent layer whose average index of refraction is not actually 1.5, a conversion is carried out by assuming that average index of refraction is 1.5. Also, the perpendicular phase difference Rth is treated in a similar manner.

When it is stated herein that "the Nz factor of the first first-class birefringent layer is substantially the same as that of the second first-class birefringent layer," the difference in the Nz factor is less than 0.1, and preferably less than 0.05. When it is stated that the "in-plane slow axis of the first first-class birefringent layer is at an angle of substantially 45° to the absorption axis of the first polarizer," the angle between the in-plane slow axis of the first first-class birefringent layer and the absorption axis of the first polarizer may be 40 to 50°, and particularly preferably is 45°. Even when a relative angle between the in-plane slow axis of the first first-class birefringent layer and the absorption axis of the first polarizer is not exactly 45°, if the in-plane slow axis of the first first-class birefringent layer is orthogonal to the in-plane slow axis of the second first-class birefringent layer, sufficient preventive effect against light leakage is available in a direction normal to a substrate surface. On the other hand, in terms of antireflection function and transmittance improvement, marked effects are available when the relative angle is 45°. When it is stated that the "in-plane slow axis of the second first-class birefringent layer is substantially orthogonal to the in-plane slow axis of the first first-class birefringent layer," the angle between the in-plane slow axis of the second first-class birefringent layer and the in-plane slow axis of the first first-class birefringent layer may be 88 to 92°, and particularly preferably is 90°. When it is stated that the "absorption axis of the second polarizer is substantially orthogonal to the absorption axis of the first polarizer," the angle between the absorption axis of the second polarizer and the absorption axis of the first polarizer may be 88 to 92°, and particularly preferably is 90°. When it is stated that the "in-plane fast axis of the second-class birefringent layer is substantially orthogonal to the absorption axis of the second polarizer," the angle between the in-plane fast axis of the second-class birefringent layer and the absorption axis of the second polarizer may be 88 to 92°, and particularly preferably is 90°.

As long as the first polarizer, first first-class birefringent layer, liquid crystal cell, second first-class birefringent layer, second-class birefringent layer, and second polarizer are included as components, the liquid-crystal display device according to the present invention is not particularly limited by other members. From the viewpoint of reliably changing a polarization state (described later) of display light according to the present invention, in a preferable embodiment of the liquid-crystal display device of the present invention, other than the first polarizer, first first-class birefringent layer, liquid crystal cell, second first-class birefringent layer, second-class birefringent layer, and second polarizer, no birefringent medium is placed between the first polarizer and second polarizer. Also, from the viewpoint of reducing cost by decreasing the number of birefringent layers used for the liquid-crystal display device, in a more preferable embodiment of the liquid-crystal display device according to the present invention, other than the first polarizer, first first-class birefringent layer, liquid crystal cell, second first-class birefringent layer, second-class birefringent layer, and second polarizer, no birefringent medium is included in the liquid-crystal display device. On the other hand, other than the first polarizer, first first-class birefringent layer, liquid crystal cell, second first-class birefringent layer, second-class birefringent layer, and second polarizer, a birefringent medium may be included in the liquid-crystal display device. For example, to adjust wavelength dispersion of the birefringent layers and the like, a half-wave plate whose in-plane phase difference has been adjusted to a half wave may be internally added to the liquid-crystal display device.

Also, the inventors have found that factors that impede a complete black display vary depending on the orientation and that if a third-class birefringent layer is placed between the first and second quarter-wave plates, optical phase difference compensation can be made for multiple orientations. When a third-class birefringent layer is provided, by adjusting a phase difference value of the third-class birefringent layer first, conditions for optical phase difference compensation for the third-class birefringent layer at a 0-degree orientation can be optimized. Next, by appropriately adjusting a phase difference value of the second-class birefringent layer, conditions for optical phase difference compensation at a 45-degree orientation can be optimized without changing the conditions for optical phase difference compensation at the 0-degree orientation. This allows light leakage in oblique directions to be reduced in a wide range of orientations during black display. Consequently, high contrast ratios can be achieved in a wide range of viewing angles in terms of both orientation and polar angle. Furthermore, the third-class birefringent layer can be produced in a simple and easy way using a material with appropriate intrinsic birefringence unlike a biaxial phase difference film controlled to satisfy nx>nz>ny (0<Nz<1). As used herein, the term "orientation" means orientation in a direction parallel to the substrate surface of the liquid crystal cell, and available values are 0 to 360°. The term "polar angle" means a tilt angle from the direction normal to the substrate surface of the liquid crystal cell, and available values are 0 to 90°.

That is, the liquid-crystal display device according to the present invention may have at least one third-class birefringent layer at least one of between the first quarter-wave plate and the liquid crystal cell and between the liquid crystal cell and the second quarter-wave plate. The third-class birefringent layer is used suitably especially when the Nz of the first first-class birefringent layer and second first-class birefringent layer is less than 2.00. Preferably the third-class birefringent layer is placed next to the liquid crystal cell. The phrase "placed next to" means that no birefringent medium is provided between the third-class birefringent layer and liquid crystal cell, and, for example, an isotropic film may be placed between the third-class birefringent layer and liquid crystal cell. When multiple third-class birefringent layers are provided, preferably at least, one of the multiple third-class birefringent layers is placed next to the liquid crystal cell and the third-class birefringent layers are placed next to each other. When the Nz of the first first-class birefringent layer and second first-class birefringent layer is equal to or larger than 2.00, the liquid-crystal display device according to the present invention does not need to have a third-class birefringent layer between the first quarter-wave plate and the liquid crystal cell or between the liquid crystal cell and the second quarter-wave plate.

In relation to the third-class birefringent layer, nx≅ny can be translated into |nx−ny|≅0. Specifically, this means that the in-plane phase difference R=|nx−ny|×d is less than 20 nm, and preferably the in-plane phase difference R is less than 10 nm. Regardless of whether the third-class birefringent layer has a single-layer structure or multi-layer structure, as long as the third-class birefringent layer is placed on the inner side of the first quarter-wave plate and the second quarter-wave plate (on the side of the liquid crystal cell) and the sum total of perpendicular phase difference is constant, characteristics of transmitted light intensity of the liquid-crystal display device is exactly the same in principle. Also, even when the liquid-crystal display device actually does not have a third-class birefringent layer, there is no harm, in principle, in assuming that the liquid-crystal display device virtually has a third-class birefringent layer with zero perpendicular phase difference. Thus, for the simplicity of explanation, in the description of the liquid-crystal display device according to the present invention, it is assumed hereinafter only that one third-class birefringent layer is placed between the second quarter-wave plate and the liquid crystal cell unless otherwise noted.

The polarizers described above are typically made, for example, of a polyvinyl alcohol (PVA) film with a dichroic anisotropic material such as an iodine complex absorbed and aligned therein. In practical use, both sides of the PVA film is normally laminated with a protective film such as a triacetyl cellulose (TAC) film to ensure mechanical strength and heat and moisture resistance, but the term "polarizer" herein means only an element that has a polarizing function without including a protective film, unless otherwise noted. Incidentally, regardless of which of the first and second polarizers produces polarized light (polarizer on the back side) and which acts as an analyzer (polarizer on the side of a viewing surface), the transmitted light intensity of the liquid-crystal display device is exactly the same in principle. For the simplicity of explanation, in the description of the liquid-crystal display device, it is assumed hereinafter only that the first polarizer is the back-side polarizer unless otherwise noted.

The liquid crystal cell described above is a vertically aligned (vertical alignment mode: VA mode) liquid crystal cell that has a liquid crystal layer and color filter layers between a pair of transparent substrates, where the color filter layers include at least blue, green, and red color filter layers adapted to separate any color of blue, green, and red, respectively. The liquid crystal cell produces a black display by aligning liquid crystal molecules in the liquid crystal layer substantially vertically to the substrate surface. VA modes include Multi-domain VA (MVA) mode, Continuous Pinwheel Alignment (CPA) mode, Patterned VA (PVA) mode, Biased VA (BVA) mode, Reverse TN (RTN) mode, and In-Plane Switching-VA (IPS-VA) mode. Incidentally, "aligning liquid crystal molecules substantially vertically to the substrate surface" herein means that an average pretilt angle of the liquid crystal molecules may be 80° or above. Preferably the red color is a color with a dominant wavelength of between 620 nm and 680 nm (both inclusive), and more preferably with a dominant wavelength of between 630 nm and 670 nm (both inclusive). Preferably the green color is a color with a dominant wavelength of between 520 nm (inclusive) and 580 nm (exclusive), and more preferably with a dominant wavelength of between 530 nm and 570 nm (both inclusive). Preferably the blue color is a color with a dominant wavelength of between 420 nm (inclusive) and 480 nm (exclusive), and more preferably with a dominant wavelength of between 430 nm and 470 nm (both inclusive). In this way, the liquid crystal cell may include a blue color filter layer adapted to pass (separate) blue color, a green color filter layer adapted to pass (separate) green color, and a red color filter layer adapted to pass (separate) red color.

The liquid crystal cell described above satisfies at least one of expressions (1) and (2) above. Consequently, phase difference conditions are optimally designed not only for light (green light) with a wavelength of around 550 nm, but also for light (blue light) with a short wavelength of around 450 nm and/or light (red light) with along wavelength of around 650 nm. This makes it possible to reduce light leakage in wide ranges of viewing angles and wavelengths during black display. More specifically, when only expression (1) above is satisfied, leakage of blue light can be reduced and when only expression (2) above is satisfied, leakage of red light can be reduced. On the other hand, when both expressions (1) and (2) above are satisfied, light leakage can be reduced in an almost entire visible light range, and consequently, occurrence of a coloration phenomenon at oblique viewing angles during black display can be curbed efficiently. Incidentally, when a state in which both blue color and red color leak and a state in which only blue color or red color leaks are compared, i.e., when a state of magenta coloration and a state of blue or red coloration are compared, generally the latter state is "lighter in coloration." Therefore, it can be said that coloration can be reduced even when only one of expressions (1) and (2) above is satisfied. However, the perpendicular phase difference of the liquid crystal cell herein is the total value of perpendicular phase difference of all the media inside the pair of transparent substrates (above-described substrates) including the pair of transparent substrates (above-described substrates), i.e., the perpendicular phase difference when the entire liquid crystal cell is measured as a specimen. Therefore, in the liquid crystal cell, when not only the liquid crystal layer, but also the transparent substrates, color filters, and other components of the liquid crystal cell have phase difference, the perpendicular phase difference of the liquid crystal cell is the total phase difference value of all these components.

Now $Rth\_all(B)$, $Rth\_all(G)$, and $Rth\_all(R)$ will be described in more detail. When no third-class birefringent layer exists between the first first-class birefringent layer and the liquid crystal cell or between the liquid crystal cell and the second first-class birefringent layer, $Rth\_all(B)$, $Rth\_all(G)$, and $Rth\_all(R)$ represent the perpendicular phase difference of the liquid crystal cell at wavelengths of 450 nm, 550 nm, and 650 nm, respectively. When at least one third-class birefringent layer exists at least one of between the first first-class birefringent layer and the liquid crystal cell and between the liquid crystal cell and the second first-class birefringent layer, $Rth\_all(B)$, $Rth\_all(G)$, and $Rth\_all(R)$ represent values obtained by adding values of perpendicular phase difference of the third-class birefringent layer at wavelengths of 450 nm, 550 nm, and 650 nm to perpendicular phase difference of the liquid crystal cell at wavelengths of 450 nm, 550 nm, and 650 nm, respectively.

In the liquid-crystal display device, if $d(R)$, $d(G)$, and $d(B)$ respectively denote thicknesses of the liquid crystal layer in regions where the blue, green, and red color filter layers are provided, preferably at least one of $d(R)$, $d(G)$, and $d(B)$ differs from the others, and more preferably $d(R)$, $d(G)$, and $d(B)$ differ from one another. This makes it possible to easily implement a liquid crystal cell that satisfies at least one of expressions (1) and (2) above.

From a similar viewpoint, in the liquid-crystal display device described above, if perpendicular phase difference of the red color filter layer at a wavelength of 650 nm is $Rth\_cf(R)$, if perpendicular phase difference of the green color filter layer at a wavelength of 550 nm is $Rth\_cf(G)$, and if perpendicular phase difference of the blue color filter layer at a wavelength of 450 nm is $Rth\_cf(B)$, at least one of $Rtf\_cf(R)$, Rth_cf(G), and Rth_cf(B) may differ from the others. In that case, more preferably Rtf_cf(R), Rth_cf(G), and Rth_cf(B) differ from one another.

Between the first polarizer and second polarizer, the liquid-crystal display device according to the present invention has a first first-class birefringent layer (first quarter-wave plate) whose in-plane phase difference is adjusted to a quarter wave, a second first-class birefringent layer (second quarter-wave plate) whose in-plane phase difference is adjusted to a quarter wave, and a second-class birefringent layer. As described above, the present invention may further have a third-class birefringent layer between the first polarizer and second polarizer. For example, preferably a combination of the second quarter-wave plate and second-class birefringent layer, a combination of the second quarter-wave plate and third-class birefringent layer, and a combination of the first quarter-wave plate and third-class birefringent layer are stacked structures produced without the use of an adhesive. The stacked structures can be produced by a method that involves laminating films with an adhesive simultaneously when the films are produced by a co-extrusion or other film extrusion process or a method that involves forming one of the birefringent layers in the stacked structure from a polymer film and forming or stacking the other birefringent layer made of a liquid crystalline material or non-liquid crystalline material on the polymer film by application or transfer. The latter method, which uses application or transfer, is suitably used to produce the stacked structure of the second quarter-wave plate and third-class birefringent layer or the stacked structure of the first quarter-wave plate and third-class birefringent layer especially because the third-class birefringent layer is often produced by the application of a non-liquid crystalline material such as polyimide or a liquid crystalline material such as cholesteric liquid crystal.

In the liquid-crystal display device according to the present invention, light incident upon the first polarizer from front direction is converted into linearly polarized light by the first polarizer, converted from the linearly polarized light into circularly polarized light by the first quarter-wave plate, transmitted through the liquid crystal cell and third-class birefringent layer by maintaining the polarization state, reconverted, by the second quarter-wave plate orthogonal to the first quarter-wave plate, from the circularly polarized light into linearly polarized light as just after passing through the first polarizer, and transmitted through the second-class birefringent layer by maintaining the polarization state. Then, the linearly polarized light is blocked by the second polarizer orthogonal to the first polarizer, creating a good black display. That is, the second-class and third-class birefringent layers are not intended to transform the polarization state of the light incident from the front direction.

Description has been given above of how a black display can be realized by keeping track of the polarization state that changes as the light passes through each layer, but this can also be understood intuitively from the following description. Specifically, in the front direction, (1) the first and second quarter-wave plates placed between the first and second polarizers are neutralized because the first and second quarter-wave plates are orthogonal to each other and equal in phase difference (to a quarter wave), thereby cancelling out each other's phase difference, (2) the second-class birefringent layer placed between the first and second polarizers is practically neutralized because the second-class birefringent layer has a fast axis that is orthogonal to the absorption axis of the second polarizer, (3) the third-class birefringent layer and liquid crystal cell placed between the first and second polarizers are practically neutralized because the third-class birefringent layer and liquid crystal cell have zero phase difference in the front direction, and (4) the first and second polarizers are oriented orthogonal to each other, forming so-called cross-Nicol polarizers. Consequently, the liquid-crystal display device according to the present invention creates a complete black display between the cross-Nicol polarizers.

On the other hand, in oblique direction, if it is assumed that the polarization state is not transformed by the second-class and third-class birefringent layers, the light incident obliquely upon the first polarizer is not blocked by the second polarizer for the three reasons described below. Consequently, the liquid-crystal display device according to the present invention cannot create a complete black display. That is, the second-class and third-class birefringent layers are intended to transform the polarization state and carry out viewing angle compensation only for the light incident obliquely.

Thus, the second-class and third-class birefringent layers according to the present invention allows a good black display to be created in oblique direction as well while maintaining a good black display in the front direction. This makes it possible to improve contrast ratios in the oblique direction and thereby implement a liquid-crystal display device with excellent viewing angle characteristics.

Next, detailed description will be given of the three reasons why the light incident from oblique direction is subjected to transformation of polarization state and viewing angle compensation by the second-class and third-class birefringent layers. Now, as shown in FIG. 1, consider a circularly polarized VA liquid-crystal display device 100 of the simplest configuration that includes a first polarizer 110 (90-degree absorption axis orientation), a first quarter-wave plate 120 (135-degree slow axis orientation), a VA liquid crystal cell 130, a second quarter-wave plate 140 (45-degree slow axis orientation), and a second polarizer 150 (0-degree absorption axis orientation) stacked in this order, but does not include any second-class or third-class birefringent layer. In FIG. 1, the arrows drawn on the first and second polarizers 110 and 150 indicate the orientations of the respective absorption axes, the arrows drawn on the first and second quarter-wave plates 120 and 140 indicate the orientations of the respective slow axes, and the ellipsoids drawn on the VA liquid crystal cell 130 represent the shape of an optical indicatrix of the VA liquid crystal cell 130.

First, consider a black display in the front direction. Light incident upon the first polarizer 110 from the front direction is converted into linearly polarized light by the first polarizer 110, converted from the linearly polarized light into circularly polarized light by the first quarter-wave plate 120, transmitted through the liquid crystal cell 130 by maintaining the polarization state, and reconverted, by the second quarter-wave plate 140 orthogonal to the first quarter-wave plate 120, from the circularly polarized light into linearly polarized light as just after passing through the first polarizer 110. Then, the linearly polarized light is blocked by the second polarizer 150 orthogonal to the first polarizer 110, creating a good black display. In other words, in the front direction, (1) the first and second quarter-wave plates 120 and 140 placed between the first and second polarizers 110 and 150 are neutralized because the first and second quarter-wave plates 120 and 140 are orthogonal to each other and equal in phase difference (a quarter wave), thereby cancelling out each other's phase difference, (2) the liquid crystal cell 130 placed between the first and second polarizers 110 and 150 is practically neutralized because the liquid crystal cell 130 has zero phase difference in the front direction, and (3) the first and second polarizers 110 and 150 are oriented orthogonal to each other, forming so-called cross-Nicol polarizers. Consequently, the liquid-crystal display device 100 creates a complete black display.

Next, consider a black display in oblique direction. A complete black display is not available due to viewing angle constraints (1) to (3) below. (1) The first and second quarter-wave plates 120 and 140, which are not orthogonal to each other or not equal in phase difference, are not neutralized, (2) the liquid crystal cell 130 is not neutralized because of non-zero phase difference, and, (3) the first and second polarizers 110 and 150, which are not orthogonal to each other, do not form cross-Nicol polarizers.

Viewing angle constraints (1) to (3) will be described in more detail with reference to FIG. 2. As schematically shown in FIG. 2(a), in the front direction (a direction normal to the substrate surface), a slow axis 121 of the first quarter-wave plate 120 and a slow axis 141 of the second quarter-wave plate 140 are orthogonal to each other. On the other hand, at a 0-degree orientation in oblique direction, the slow axis 121 of the first quarter-wave plate 120 and the slow axis 141 of the second quarter-wave plate 140 are no longer orthogonal to each other. Consequently, the first quarter-wave plate 120 and second quarter-wave plate 140 do not cancel out each other's phase difference, and thus are not neutralized. Also, as schematically shown in FIG. 2(b), in the front direction, the slow axis 121 of the first quarter-wave plate 120 and the slow axis 141 of the second quarter-wave plate 140 are orthogonal to each other. On the other hand, at a 45-degree orientation in oblique direction, although the slow axis 121 and slow axis 141 are orthogonal to each other, the first and second quarter-wave plates 120 and 140 are no longer equal in phase difference, and thus do not cancel out each other's phase difference. This is because the phase difference is determined by birefringence (refractive index difference) multiplied by thickness, but effective birefringence differs between front and oblique directions and, moreover, depends on the orientation. For the same reason, the phase difference of the VA liquid crystal cell 130 is zero in the front direction, but becomes non-zero in any oblique direction. Only in the front direction, the effective birefringence is zero, and so is the phase difference. Furthermore, as schematically shown in FIG. 2(c), an absorption axis 111 of the first polarizer 110 and an absorption axis 151 of the second polarizer 150 are orthogonal to each other in the front direction, but are no longer orthogonal to each other at a 45-degree orientation in oblique direction.

As described above, with the circularly polarized VA liquid-crystal display device 100 of the minimum configuration, a complete black display is not available in oblique direction due to three viewing angle constraints (1) to (3) described above. To put it the other way around, if the constraints can be dealt with, i.e., if optical compensation can be done, a good black display can be created even in oblique direction. Viewing angle improvement techniques (A) to (E) described earlier actually take such measures. In many cases, viewing angle constraints (1) and (2) described above are encountered in a combined form. Thus, in the optical compensation, a technique may be used that optimally deals with viewing angle constraints (1) and (2) collectively rather than individually.

Based on design principles described in detail below, the circularly polarized VA liquid-crystal display device according to the present invention has been designed to simultaneously carry out optical compensation for viewing angle constraints (1) to (3) described above. Specifically, this has been achieved using general-purpose biaxial quarter-wave plates (first-class birefringent layers) that satisfy the relationship nx>ny≥nz as the first and second quarter-wave plates, adjusting the Nz factors of the first and second quarter-wave plates to be substantially the same, placing a birefringent layer (second-class birefringent layer) that satisfies the relationship nx<ny≤nz between the second quarter-wave plate and second polarizer, and placing, as required, a birefringent layer (third-class birefringent layer) that satisfies the relationship nx=ny>nz between the first and second quarter-wave plates.

Now design principles of the birefringent layers in the present invention will be described. The inventor has conducted various studies in order to carry out optical compensation for the above-described viewing angle constraints easily and effectively, and noticed that the necessity for optical compensation varies with the orientation. Consequently, the inventor has found that optical compensation of polarizers for viewing angle constraint (3) is not necessary at a 0-degree orientation as shown in Table 1 below and that in this orientation, it is necessary to carry out only optical compensation of quarter-wave plates for viewing angle constraint (1) and optical compensation of the liquid crystal cell for viewing angle constraint (2).

TABLE 1

| | Necessity of optical compensation | | |
|---|---|---|---|
| Direction | (1) Quarter-wave plate | (2) Liquid crystal cell | (3) Polarizer |
| 0° | needed | needed | not needed |
| 45° | needed | needed | needed |

Furthermore, based on illustrations of polarization states using the Poincare sphere and on computer simulations, the inventor has realized that optical compensation for viewing angle constraints (1) and (2) at a 0-degree orientation can be carried out simultaneously in an effective manner by optimally adjusting the Nz factor Nzq of the first and second quarter-wave plates and the perpendicular phase difference Rlc of the liquid crystal cell and placing, as required, a third-class birefringent layer that satisfies the relationship nx=ny>nz between the first and second quarter-wave plates and optimally adjusting the perpendicular phase difference R3 of the third-class birefringent layer. Herein, the process of selecting optimal values of the Nz factor Nzq of the first and second quarter-wave plates, perpendicular phase difference Rlc of the liquid crystal cell, and perpendicular phase difference R3 of the third-class birefringent layer for the purpose of optical compensation at the 0-degree orientation as described above will be referred to as a 1st step.

Then, the inventor has realized that optical compensation for viewing angle constraints (1) to (3) described above at a 45-degree orientation can be carried out simultaneously in an effective manner after the 1st step by placing a second-class birefringent layer that satisfies the relationship nx<ny≤nz between the second quarter-wave plate and second polarizer such that the in-plane fast axis of the second-class birefringent layer will be substantially orthogonal to the absorption axis of the second polarizer and optimally adjusting an Nz factor Nz2 and in-plane phase difference P2 of the second-class birefringent layer. Herein, the process of selecting optimal values of the Nz factor Nz2 and in-plane phase difference P2 of the second-class birefringent layer for the purpose of optical compensation at the 45-degree orientation after the 1st step as described above will be referred to as a 2nd step.

Since the in-plane fast axis of the second-class birefringent layer added in the 2nd step is placed so as to be substantially orthogonal to the absorption axis of the adjacent second polarizer, there is no change in optical characteristics at the absorption axis orientation of the second polarizer, i.e., at the 0-degree orientation. An optical compensation process according to the present invention is characterized in that an optimized state established in the 1st step is maintained as before even after the 2nd step. In this way, the 1st step and 2nd step can be treated completely independently of each other, making it easy to design birefringent layers.

Details of optical compensation principles in the 1st step and 2nd step are explained described above by illustrations using the Poincare sphere as follows. The idea of the Poincare sphere is well known in the field of crystal optics and the like as a useful technique for keeping track of polarization state that changes through birefringent layers (see, for example, Hiroshi Takasaki "Crystal Optics," Morikita Publishing, 1975, pp. 146-163).

With the Poincare sphere, the northern hemisphere represents clockwise polarization, the southern hemisphere represents counter-clockwise polarization, the equator represents linearly polarized light, and the north and south poles respectively represent right-handed circularly polarized light and left-handed circularly polarized light. Two polarization states symmetrical with respect to the center of the sphere are equal in the absolute value of ellipticity angle but opposite in polarity, forming a pair of orthogonal polarizations.

The effect of a birefringent layer on the Poincare sphere is to rotationally translate a point that represents the polarization state just before passage through the birefringent layer counter-clockwise around the slow axis (more specifically, the position, on the Poincare sphere, of the point that represents the polarization state of the slower of two natural vibration modes of the birefringent layer) on the Poincare sphere by an angle given by 2π×"phase difference"/"wavelength" (in rads) (even if the point is rotationally translated clockwise around the fast axis, the result is the same).

The center of rotation and angle of rotation when observed obliquely are determined by the slow axis (or fast axis) and phase difference at the observation angle. This can be calculated from vibration directions and wave vectors of the natural vibration modes of the birefringent layer, which in turn can be calculated, for example, by solving Fresnel's equation of wave normals although detailed description is omitted. The slow axis observed obliquely depends on the observation angle and Nz factor while the phase difference observed obliquely depends on the observation angle, Nz factor, and in-plane phase difference R (or perpendicular phase difference Rth).

(Compensation Principles in the 1st Step)

To begin with, consider the polarization state when the circularly polarized VA liquid-crystal display device 100 in FIG. 1 is observed from the front direction. Under this condition, the light emitted from a backlight (located below the first polarizer although not illustrated in FIG. 1) is transmitted through the polarizers 110 and 150, birefringent layers 120 and 140, and liquid crystal cell 130, changing its polarization state upon transmission through each object as illustrated on an S1-S2 plane of the Poincare sphere in FIG. 3. Points that represent the polarization states are located actually on the Poincare sphere, but projected onto the S1-S2 plane. The points that represent the polarization states are indicated by circles and points that represent the slow (fast) axes of the birefringent layers are indicated by x.

The polarization state of light just after transmission through the first polarizer 110 is located at point P0 on the Poincare sphere. This coincides with the polarization state which is represented by point E and in which the light can be absorbed by the second polarizer 150, i.e., with the extinction position (absorption axis orientation) of the second polarizer 150. Then, as the light is transmitted through the first quarter-wave plate 120, the polarization state located at point P0 is rotationally transformed a specific angle around the slow axis of the first quarter-wave plate 120 represented by point Q1 on the Poincare sphere, and reaches point P1. At this time, the rotational direction is counter-clockwise when viewed in the direction of the origin O from point Q1.

Next, the light is transmitted through the VA liquid crystal cell 130, but the polarization state does not change because the VA liquid crystal cell 130 has zero phase difference in the front direction. Finally, as the light is transmitted through the second quarter-wave plate 140, its polarization state is rotationally transformed a specific angle around the slow axis of the second quarter-wave plate 140 represented by point Q2, and reaches point P2, which coincides with the extinction position E of the second polarizer 150. In this way, the liquid-crystal display device 100 in FIG. 1 can block the light from the backlight when observed from the front direction and create a good black display.

Furthermore, consider the polarization state when the circularly polarized VA liquid-crystal display device 100 in FIG. 1 is observed at a 0-degree absorption axis orientation of the second polarizer 150, from a direction tilted 60° from the normal line direction (hereinafter also referred to as a 60-degree tilt from the normal line). Under this condition, the light emitted from the backlight is transmitted through the polarizers 110 and 150, birefringent layers 120 and 140, and liquid crystal cell 130, changing its polarization state upon transmission through each object as illustrated on the S1-S2 plane of the Poincare sphere in FIG. 4.

The polarization state of light just after transmission through the first polarizer 110 is located at point P0 on the Poincare sphere. This coincides with the polarization state which is represented by point E and in which the light can be absorbed by the second polarizer 150, i.e., with the extinction position (absorption axis orientation) of the second polarizer 150. Then, as the light is transmitted through the first quarter-wave plate 120, the polarization state located at point P0 is rotationally transformed a specific angle around the slow axis of the first quarter-wave plate 120 represented by point Q1 on the Poincare sphere, and reaches point P1. At this time, the rotational direction is counter-clockwise when viewed in the direction of the origin O from point Q1.

Next, as the light is transmitted through the VA liquid crystal cell 130, its polarization state is rotationally transformed a specific angle around the slow axis of the liquid crystal cell 130 represented by point L on the Poincare sphere, and reaches point P2. At this time, the rotational direction is counter-clockwise when viewed in the direction of the origin O from point L. Finally, as the light is transmitted through the second quarter-wave plate 140, its polarization state is rotationally transformed a specific angle around the slow axis of the second quarter-wave plate 140 represented by point Q2, and reaches point P3, which does not coincide with the extinction position E of the second polarizer 150. In this way, the liquid-crystal display device 100 in FIG. 1 cannot block the light from the backlight when observed at a 0-degree orientation, with a 60-degree tilt from the normal line.

In FIGS. 3 and 4, the positions of points P1 to P3 depend on the Nz factor Nzq of the first and second quarter-wave plates 120 and 140 as well as on the perpendicular phase difference Rlc of the liquid crystal cell 130. As an example, FIGS. 3 and 4 illustrate an embodiment in which Nzq=1.6 and Rlc=320 nm. To make it easier to understand transformation of polarization states, the positions of the points are shown roughly and are not always strictly accurate. Also, to make the drawings clear, arrows that indicate transformation directions of points P1 to P3 are not illustrated. The Rlc of the VA liquid crystal cell 130 is typically about 320 nm, and is generally adjusted within a range of 270 to 400 nm. For example, the Rlc is sometimes set to be larger than 320 nm in order to increase transmittance. The Nz factor Nzq of the first and second quarter-wave plates 120 and 140 is generally adjusted within a range of 1.0 to 2.9. For example, in the case of a VA liquid crystal cell whose Rlc is set to around 400 nm and which does not use any third-class birefringent layer, a quarter-wave plate with Nzq=2.9 is used suitably.

Next, consider a circularly polarized VA liquid-crystal display device 200 that includes a third-class birefringent layer. Specifically, as shown in FIG. 5, the circularly polarized VA liquid-crystal display device 200 includes a first polarizer 210 (90-degree absorption axis orientation), a first quarter-wave plate 220 (135-degree slow axis orientation), a VA liquid crystal cell 230, a third-class birefringent layer 235, a second quarter-wave plate 240 (45-degree slow axis orientation), and a second polarizer 250 (0-degree absorption axis orientation) stacked in this order. Incidentally, in FIG. 5, the arrows drawn on the first and second polarizers 210 and 250 indicate the orientations of the respective absorption axes, the arrows drawn on the first and second quarter-wave plates 220 and 240 indicate the orientations of the respective slow axes, and the ellipsoids drawn on the VA liquid crystal cell 230 and third-class birefringent layer 235 represent the shapes of optical indicatrices of the VA liquid crystal cell 230 and third-class birefringent layer 235.

To begin with, consider the polarization state when the circularly polarized VA liquid-crystal display device 200 in FIG. 5 is observed from the front direction. Under this condition, the light emitted from a backlight (located below the first polarizer 210 although not illustrated in FIG. 5) is transmitted through the polarizers 210 and 250, birefringent layers 220 and 240, and liquid crystal cell 230, changing its polarization state upon transmission through each object as illustrated on the S1-S2 plane of the Poincare sphere in FIG. 6.

The polarization state of light just after transmission through the first polarizer 210 is located at point P0 on the Poincare sphere. This coincides with the polarization state which is represented by point E and in which the light can be absorbed by the second polarizer 250, i.e., with the extinction position (absorption axis orientation) of the second polarizer 250. Then, as the light is transmitted through the first quarter-wave plate 220, the polarization state located at point P0 is rotationally transformed a specific angle around the slow axis of the first quarter-wave plate 220 represented by point Q1 on the Poincare sphere, and reaches point P1. At this time, the rotational direction is counter-clockwise when viewed in the direction of the origin O from point Q1.

Next, the light is transmitted through the VA liquid crystal cell 230 and third-class birefringent layer 235, but the polarization state does not change because the VA liquid crystal cell 230 and third-class birefringent layer 235 have zero phase difference in the front direction. Finally, as the light is transmitted through the second quarter-wave plate 240, its polarization state is rotationally transformed a specific angle around the slow axis of the second quarter-wave plate 240 represented by point Q2, and reaches point P2, which coincides with the extinction position E of the second polarizer 250. In this way, the liquid-crystal display device 200 in FIG. 5 can block the light from the backlight when observed from the front direction and create a good black display, as in the case of the liquid-crystal display device 100 in FIG. 1.

Furthermore, consider the polarization state when the circularly polarized VA liquid-crystal display device 200 in FIG. 5 is observed from a direction tilted 60°, at a 0-degree absorption axis orientation of the second polarizer 210. Under this condition, the light emitted from the backlight is transmitted through the polarizers 210 and 250, birefringent layers 220 and 240, and liquid crystal cell 230, changing its polarization state upon transmission through each object as illustrated on the S1-S2 plane of the Poincare sphere in FIG. 7.

First, the polarization state of light just after transmission through the first polarizer 210 is located at point P0 on the Poincare sphere. This coincides with the polarization state which is represented by point E and in which the light can be absorbed by the second polarizer 250, i.e., with the extinction position (absorption axis orientation) of the second polarizer 250. Then, as the light is transmitted through the first quarter-wave plate 220, the polarization state located at point P0 is rotationally transformed a specific angle around the slow axis of the first quarter-wave plate 220 represented by point Q1 on the Poincare sphere, and reaches point P1. At this time, the rotational direction is counter-clockwise when viewed in the direction of the origin O from point Q1.

Next, as the light is transmitted through the VA liquid crystal cell 230, its polarization state is rotationally transformed a specific angle around the slow axis of the liquid crystal cell 230 represented by point L on the Poincare sphere, and reaches point P2. At this time, the rotational direction is counter-clockwise when viewed in the direction of the origin O from point L. Next, as the light is transmitted through the third-class birefringent layer 235, its polarization state is rotationally transformed a specific angle around the slow axis of the third-class birefringent layer 235 represented by point R3 on the Poincare sphere, and reaches point P3. At this time, the rotational direction is counter-clockwise when viewed in the direction of the origin O from point R3. Finally, as the light is transmitted through the second quarter-wave plate 240, its polarization state is rotationally transformed a specific angle around the slow axis of the second quarter-wave plate 240 represented by point Q2, and reaches point P4, which coincides with the extinction position E of the second polarizer 250. In this way, the liquid-crystal display device 200 in FIG. 5 can also block the light from the backlight when observed obliquely at a 0-degree orientation, with a 60-degree tilt from the normal line, as when observed from the front direction.

In FIGS. 6 and 7, the positions of points P1 to P4 depend on the Nz factor Nzq of the first and second quarter-wave plates 220 and 240, the perpendicular phase difference Rlc of the liquid crystal cell 230, and the perpendicular phase difference R3 of the third-class birefringent layer 235. As an example, FIGS. 6 and 7 illustrate an embodiment in which Nzq=1.6, Rlc=320 nm, and R3=−129 nm. To make it easier to understand transformation of polarization states, the positions of the points are shown roughly and are not always strictly accurate. Also, to make the drawings clear, arrows that indicate transformation directions of points P1 to P4 are not illustrated.

Studies conducted by the inventor show that the third-class birefringent layer 235 has an optimal phase difference value R3 according to the Nz factor Nzq of the first and second quarter-wave plates 220 and 240. FIGS. 8 and 9 illustrate polarization states on the S1-S2 plane of the Poincare sphere when the circularly polarized VA liquid-crystal display device 200 in FIG. 5 is observed from a direction tilted 60°, at a 0-degree absorption axis orientation of the second polarizer 250. FIG. 8 illustrates an embodiment in which Nzq=2.0, Rlc=320 nm, and R3=−61 nm while FIG. 9 illustrates a form in which Nzq=2.35, Rlc=320 nm, and R3=0 nm.

As can be seen from FIGS. 7, 8, and 9, with increases in the Nz factor Nzq of the first and second quarter-wave plates 220 and 240, point P1 that represents the polarization state just after transmission through the first quarter-wave plate 220 and point P2 that represents the polarization state just after transmission through the VA liquid crystal cell 230 approach points symmetrical with respect to an S1 axis, resulting in decreases in an amount of P2-to-P3 transformation needed to superimpose point P4 and point E on each other, i.e., the absolute value of required phase difference R3 of the third-class birefringent layer 235. Since the Rlc of the VA liquid crystal cell 230 is generally adjusted within a range of 270 to 400 nm as described above, when Nzq of the first and second quarter-wave plates 220 and 240 exceeds 2.00, the required phase difference R3 of the third-class birefringent layer 235 becomes substantially zero. That is, the third-class birefringent layer 235 becomes unnecessary. At a phase difference value Rlc=320 nm of a typical VA liquid crystal cell, when Nzq=2.35, the required phase difference R3 of the third-class birefringent layer becomes substantially zero.

A relationship between the Nz factor Nzq of the first and second quarter-wave plates 220 and 240 and the optimal value of the perpendicular phase difference R3 of the third-class birefringent layer 235 was studied using computer simulations and results are shown in Table 2 and FIG. 10. In the illustrations in FIGS. 7, 8, and 9 using the Poincare sphere, the transformation of polarization state from point P1 to point P3 are divided into transformation from P1 to P2 based on the perpendicular phase difference Rlc of the VA liquid crystal cell 230 and transformation from P2 to P3 based on the perpendicular phase difference R3 of the third-class birefringent layer 235. However, the two transformations have the same center of rotation and opposite rotational directions. The rotational direction is determined by the sign of perpendicular phase difference and the angle of rotation is determined by the absolute value of the perpendicular phase difference. Therefore, the two transformations can also be regarded as a direct P1-to-P3 transformation of "the total perpendicular phase difference (Rlc+R3)" of "the VA liquid crystal cell 230 and third-class birefringent layer 235." In other words, as long as Rlc+R3 is equal, the optical characteristics of the liquid-crystal display device are the same regardless of the perpendicular phase difference Rlc of the VA liquid crystal cell 230. Thus, optimal values of Rlc+R3 calculated from computer simulations are shown in Table 2. As can be seen from Table 2 and FIG. 10, the relationship between Nzq and the optimal value of Rlc+R3 is approximated fairly well by expression (A) below within a range of $1.0 \leq Nzq \leq 2.9$. The solid line in FIG. 10 represents expression (A) below.

$$Rlc+R3=169 \text{ nm} \times Nzq - 81 \text{ nm} \quad \text{(A)}$$

From the viewpoint of implementing a liquid-crystal display that can achieve high contrast ratios in a wide range of viewing angles, most preferably, during black display (when no voltage is applied to the liquid crystal layer), Rlc+R3, i.e., the sum of the perpendicular phase difference Rlc of the VA liquid crystal cell 230 and perpendicular phase difference R3 of the third-class birefringent layer 235, takes the optimal value shown in Table 2 and FIG. 10, but may deviate more or less from the optimal value as long as the contrast ratios at oblique viewing angles do not lower greatly. In order to fully achieve the operation and effects of the present invention, preferably the sum Rlc+R3 is within a range of the optimal value ±30 nm.

TABLE 2

| Nzq | Rlc + R3 (nm) |
|---|---|
| 1.00 | 88 |
| 1.10 | 105 |
| 1.20 | 122 |
| 1.30 | 140 |
| 1.40 | 157 |
| 1.50 | 174 |
| 1.60 | 191 |
| 1.70 | 208 |
| 2.00 | 259 |
| 2.30 | 309 |
| 2.40 | 325 |
| 2.50 | 342 |
| 2.90 | 406 |

(Compensation Principles in the 2nd Step)

To begin with, consider a case where after the 1st step, the liquid-crystal display device 200 in FIG. 5 is observed from a direction tilted 60°, at an orientation (hereinafter sometimes referred to as a 45-degree orientation) obtained by dividing an interval between a 90-degree absorption axis orientation of the first polarizer 210 and a 0-degree absorption axis orientation of the second polarizer 250 into two parts. As described above, in the 1st step, the liquid-crystal display device 200 undergoes optical compensation at the 0-degree orientation by selecting the optimal values of the perpendicular phase difference Rlc of the liquid crystal cell 230 and perpendicular phase difference R3 of the third-class birefringent layer 235 according to the Nz factor Nzq of the first and second quarter-wave plates 220 and 240. Under this condition, the light emitted from the backlight is transmitted through the polarizers 210 and 250, birefringent layers 220 and 240, and liquid crystal cell 230, changing its polarization state upon transmission through each object as illustrated on the S1-S2 plane of the Poincare sphere in FIG. 11.

First, the polarization state of light just after transmission through the first polarizer 210 is located at point P0 on the Poincare sphere. This does not coincide with the polarization state which is represented by point E and in which the light can be absorbed by the second polarizer 250, i.e., with the extinction position (absorption axis orientation) of the second polarizer 250. The first and second polarizers 210 and 250 are no longer orthogonal to each other at a 45-degree orientation in oblique direction, indicating the need for optical compensation. Then, as the light is transmitted through the first quarter-wave plate 220, the polarization state located at point P0 is rotationally transformed a specific angle around the slow axis of the first quarter-wave plate 220 represented by point Q1 on the Poincare sphere, and reaches point P1. At this time, the rotational direction is counter-clockwise when viewed in the direction of the origin O from point Q1.

Next, as the light is transmitted through the VA liquid crystal cell 230, its polarization state is rotationally transformed a specific angle around the slow axis of the liquid crystal cell 230 represented by point L on the Poincare sphere, and reaches point P2. At this time, the rotational direction is counter-clockwise when viewed in the direction of the origin O from point L. Next, as the light is transmitted through the third-class birefringent layer 235, its polarization state is rotationally transformed a specific angle around the slow axis of the third-class birefringent layer 235 represented by point R3 on the Poincare sphere, and reaches point P3. At this time, the rotational direction is counter-clockwise when viewed in the direction of the origin O from point R3. Finally, as the light is transmitted through the second quarter-wave plate 240, its polarization state is rotationally transformed a specific angle around the slow axis of the second quarter-wave plate 240 represented by point Q2, and reaches point P4, which does not coincide with the extinction position E of the second polarizer 250. In this way, the liquid-crystal display device 200 in FIG. 5 cannot block the light from the backlight when observed obliquely at a 45-degree orientation, with a 60-degree tilt from the normal line. That is, after going through only the 1st step, the liquid-crystal display device 200 has not undergone optical compensation at a 45-degree orientation.

In FIG. 11, the positions of points P1 to P4 depend on the Nz factor Nzq of the first and second quarter-wave plates 220 and 240, the perpendicular phase difference Rlc of the liquid crystal cell 230, and the perpendicular phase difference R3 of the third-class birefringent layer 235. As an example, FIG. 11 illustrates an embodiment in which Nzq=1.6, Rlc=320 nm, and R3=−129 nm. To make it easier to understand transformation of polarization states, the positions of the points are shown roughly and are not always strictly accurate. Also, to make the drawings clear, arrows that indicate transformation directions of points P1 to P4 are not illustrated.

Next, consider a circularly polarized VA liquid-crystal display device 300 that includes a second-class birefringent layer. Specifically, as shown in FIG. 12, the circularly polarized VA liquid-crystal display device 300 includes a first polarizer 310 (90-degree absorption axis orientation), a first quarter-wave plate 320 (135-degree slow axis orientation), a VA liquid crystal cell 330, a third-class birefringent layer 335, a second quarter-wave plate 340 (45-degree slow axis orientation), a second-class birefringent layer 345 (90-degree fast axis orientation), and a second polarizer 350 (0-degree absorption axis orientation) stacked in this order. The second-class birefringent layer has been added to the configuration in FIG. 5 to carry out optical compensation at a 45-degree orientation. Incidentally, in FIG. 12, the arrows drawn on the first and second polarizers 310 and 350 indicate the orientations of the respective absorption axes, the arrows drawn on the first and second quarter-wave plates 320 and 340 indicate the orientations of the respective slow axes, the arrow drawn on the second-class birefringent layer 345 indicates its fast axis, and the ellipsoids drawn on the VA liquid crystal cell 330 and third-class birefringent layer 335 represent the shapes of optical indicatrices of the VA liquid crystal cell 330 and third-class birefringent layer 335.

To begin with, consider the polarization state when the circularly polarized VA liquid-crystal display device 300 in FIG. 12 is observed from the front direction. The light emitted from a backlight (located below the first polarizer 310 although not illustrated in FIG. 12) is transmitted through the polarizers 310 and 350, birefringent layers 320 and 340, and liquid crystal cell 330, changing its polarization state upon transmission through each object as illustrated on the S1-S2 plane of the Poincare sphere in FIG. 13.

First, the polarization state of light just after transmission through the first polarizer 310 is located at point P0 on the Poincare sphere. This coincides with the polarization state which is represented by point E and in which the light can be absorbed by the second polarizer 350, i.e., with the extinction position (absorption axis orientation) of the second polarizer 350. Then, as the light is transmitted through the first quarter-wave plate 320, the polarization state located at point P0 is rotationally transformed a specific angle around the slow axis of the first quarter-wave plate 320 represented by point Q1 on the Poincare sphere, and reaches point P1. At this time, the rotational direction is counter-clockwise when viewed in the direction of the origin O from point Q1.

Next, the light is transmitted through the VA liquid crystal cell 330 and third-class birefringent layer 335, but the polarization state does not change because the VA liquid crystal cell 330 and third-class birefringent layer 335 have zero phase difference in the front direction. Next, as the light is transmitted through the second quarter-wave plate 340, its polarization state is rotationally transformed a specific angle around the slow axis of the second quarter-wave plate 340 represented by point Q2, and reaches point P2. Finally, as the light is transmitted through the second-class birefringent layer 345, the polarization state located at point P2 is rotationally transformed a specific angle around the fast axis of the second-class birefringent layer 345 represented by point R2 on the Poincare sphere, but remains at point P2, which coincides with the extinction position E of the second polarizer 350. In this way, the liquid-crystal display device 300 in FIG. 12 can block the light from the backlight when observed from the front direction and create a good black display, as in the case of the liquid-crystal display device 100 in FIG. 1.

Now, consider the polarization state when the circularly polarized VA liquid-crystal display device 300 in FIG. 12 is observed from a direction tilted 60°, at a 45-degree orientation. Under this condition, the light emitted from the backlight is transmitted through the polarizers 310 and 350, birefringent layers 320 and 340, and liquid crystal cell 330, changing its polarization state upon transmission through each object as illustrated on the S1-S2 plane of the Poincare sphere in FIG. 14.

First, the polarization state of light just after transmission through the first polarizer 310 is located at point P0 on the Poincare sphere. This does not coincide with the polarization state which is represented by point E and in which the light can be absorbed by the second polarizer 350, i.e., with the extinction position (absorption axis orientation) of the second polarizer 350. Then, as the light is transmitted through the first quarter-wave plate 320, the polarization state located at point P0 is rotationally transformed a specific angle around the slow axis of the first quarter-wave plate 320 represented by point Q1 on the Poincare sphere, and reaches point P1. At this time, the rotational direction is counter-clockwise when viewed in the direction of the origin O from point Q1.

Next, as the light is transmitted through the VA liquid crystal cell 330, its polarization state is rotationally transformed a specific angle around the slow axis of the liquid crystal cell 330 represented by point L on the Poincare sphere, and reaches point P2. At this time, the rotational direction is counter-clockwise when viewed in the direction of the origin O from point L. Next, as the light is transmitted through the third-class birefringent layer 335, its polarization state is rotationally transformed a specific angle around the slow axis of the third-class birefringent layer 335 represented by point R3 on the Poincare sphere, and reaches point P3. At this time, the rotational direction is counter-clockwise when viewed in the direction of the origin O from point R3. Next, as the light is transmitted through the second quarter-wave plate 340, its polarization state is rotationally transformed a specific angle around the slow axis of the second quarter-wave plate 340 represented by point Q2, and reaches point P4. Finally, as the light is transmitted through the second-class birefringent layer 345, its polarization state is rotationally transformed a specific angle around the fast axis of the second-class birefringent layer 345 represented by point P2 on the Poincare sphere, and reaches point P5. At this time, the rotational direction is clockwise when viewed in the direction of the origin O from point P2. Point P5 coincides with the extinction position E of the second polarizer 350. In this way, the liquid-crystal display device 300 in FIG. 12 can also block the light from the backlight when observed obliquely at a 45-degree orientation, with a 60-degree tilt from the normal line, as when observed from the front direction.

Finally, consider the polarization state when the circularly polarized VA liquid-crystal display device 300 in FIG. 12 is observed from a direction tilted 60°, at a 0-degree orientation. Under this condition, the light emitted from the backlight is transmitted through the polarizers 310 and 350, birefringent layers 320 and 340, and liquid crystal cell 330, changing its polarization state upon transmission through each object as illustrated on the S1-S2 plane of the Poincare sphere in FIG. 15.

First, the polarization state of light just after transmission through the first polarizer 310 is located at point P0 on the Poincare sphere. This coincides with the polarization state which is represented by point E and in which the light can be absorbed by the second polarizer 350, i.e., with the extinction position (absorption axis orientation) of the second polarizer 350. Then, as the light is transmitted through the first quarter-wave plate 320, the polarization state located at point P0 is rotationally transformed a specific angle around the slow axis of the first quarter-wave plate 320 represented by point Q1 on the Poincare sphere, and reaches point P1. At this time, the rotational direction is counter-clockwise when viewed in the direction of the origin O from point Q1.

Next, as the light is transmitted through the VA liquid crystal cell 330, its polarization state is rotationally transformed a specific angle around the slow axis of the liquid crystal cell 330 represented by point L on the Poincare sphere, and reaches point P2. At this time, the rotational direction is counter-clockwise when viewed in the direction of the origin O from point L. Next, as the light is transmitted through the third-class birefringent layer 335, its polarization state is rotationally transformed a specific angle around the slow axis of the third-class birefringent layer 335 represented by point R3 on the Poincare sphere, and reaches point P3. At this time, the rotational direction is counter-clockwise when viewed in the direction of the origin O from point R3. Next, as the light is transmitted through the second quarter-wave plate 340, its polarization state is rotationally transformed a specific angle around the slow axis of the second quarter-wave plate 340 represented by point Q2, and reaches point P4. Finally, as the light is transmitted through the second-class birefringent layer 345, the polarization state located at point P4 is rotationally transformed a specific angle around the fast axis of the second-class birefringent layer 345 represented by point P2 on the Poincare sphere, but remains at point P4, which coincides with the extinction position E of the second polarizer 350. In this way, the liquid-crystal display device 300 in FIG. 12 can block the light from the backlight even when observed obliquely at a 0-degree orientation, with a 60-degree tilt from the normal line and create a good black display, as when observed from the front direction.

Thus, after going through the 2nd step, the liquid-crystal display device 300 in FIG. 12 can block the light from the backlight when observed from any of oblique directions at 0-degree and 45-degree orientations as well as the front direction and thereby create a good black display.

In FIGS. 13, 14, and 15, the positions of points P1 to P5 depend on the Nz factor Nzq of the first and second quarter-wave plates 320 and 340, the perpendicular phase difference Rlc of the liquid crystal cell 330, the perpendicular phase difference R3 of the third-class birefringent layer 335, and the Nz factor Nz2 and in-plane phase difference P2 of the second-class birefringent layer 345. As an example, FIGS. 13, 14, and 15 illustrate an embodiment in which Nzq=1.6, Rlc=320 nm, R3=−129 nm, Nz2=−0.30, and R2=118 nm. To make it easier to understand transformation of polarization states, the positions of the points are shown roughly and are not always strictly accurate. Also, to make the drawings clear, arrows that indicate transformation directions of points P1 to P5 are not illustrated.

Studies conducted by the inventor show that the second-class birefringent layer 345 has optimal values of the Nz factor Nz2 and phase difference P2 according to the Nz factor Nzq of the first and second quarter-wave plates 320 and 340. FIGS. 16 and 17 illustrate polarization states on the S1-S2 plane of the Poincare sphere when the circularly polarized VA liquid-crystal display device 300 in FIG. 12 is observed from a direction tilted 60°, at a 45-degree absorption axis orientation of the second polarizer 350. FIG. 16 illustrates an embodiment in which Nzq=2.0, Rlc=320 nm, R3=−61 nm, Nz2=−1.00, and R2=94 nm while FIG. 17 illustrates an embodiment in which Nzq=2.35, Rlc=320 nm, R3=0 nm, Nz2=−1.80, and R2=90 nm.

As can be seen from FIGS. 15, 16, and 17, with increases in the Nz factor Nzq of the first and second quarter-wave plates 320 and 340, point P4, which represents the polarization state of light just before transmission through the second-class birefringent layer 345, moves away from point E that corresponds to the extinction position, making it necessary to increase a radius of rotation of P4-to-P5 transformation needed to superimpose point P4 and point E on each other. Studies conducted by the inventor show that to increase the radius of rotation, it is necessary to increase biaxiality of the second-class birefringent layer 345. That is, it is necessary to reduce the Nz factor.

Relationships between the Nz factor Nzq of the first and second quarter-wave plates 320 and 340 and the optimal values of the Nz factor Nz2 and in-plane phase difference P2 of the second-class birefringent layer 345 were studied using computer simulations and results are shown in Table 3 and FIGS. 18 and 19. As can be seen from Table 3 and FIGS. 18 and 19, generally the relationships between Nzq and the optimal values of Nz2 and P2 are not simple, but can be approximated fairly well by expressions (B) and (C) below within a range of $1.0 \leq Nzq \leq 2.9$. The solid lines in FIGS. 18 and 19 represent expressions (B) and (C).

$$Nz2 = -0.63 \times Nzq^2 + 0.56 \times Nzq + 0.40 \quad \text{(B)}$$

$$R2 = 43 \text{ nm} \times Nzq^2 - 226 \text{ nm} \times Nzq + 370 \text{ nm} \quad \text{(C)}$$

From the viewpoint of implementing a liquid-crystal display that can achieve high contrast ratios in a wide range of viewing angles, most preferably Nz2 and P2 of the second-class birefringent layer 345 take the optimal values shown in Table 3 and FIGS. 18 and 19, but may deviate more or less from the optimal values as long as the contrast ratios at oblique viewing angles do not lower greatly. In order to fully achieve the operation and effects of the present invention, preferably Nz2 is within a range of the optimal value ±0.35 and P2 is within a range of the optimal value ±30 nm.

According to Table 3 and FIG. 18, within a range of Nzq<1.40, the optimal value of Nz2 is within a range of 0<Nz2<1. The birefringent layer whose Nz factor falls within this range is a biaxial phase difference film that satisfies the relationship nx>nz>ny. Such a film does not qualify as a second-class birefringent layer and is a film high in cost and more difficult to produce than the second-class birefringent layer. Therefore, from this viewpoint, preferably $1.40 \leq Nzq$ is satisfied. Also, the inventor has studied a method for implementing a liquid-crystal display that can achieve high contrast ratios in a wide range of viewing angles in the range of Nzq<1.40 easily at lower cost. As a result, the inventor has found that in the range of Nzq<1.40, if a second-class birefringent layer with Nz2=0 and R2=138 nm is used instead of the birefringent layer that satisfies optimal Nz2 and P2 shown in Table 3 and FIGS. 18 and 19, similar operation and effects can be achieved adequately. For example, when optimal P2 was calculated for Nzq=1.00, 1.10, 1.20, and 1.30 with Nz2 fixed at 0, optimal P2 was 138 nm in all cases regardless of the value of Nzq. In order to fully achieve the operation and effects of the present invention, preferably −0.35≤Nz2≤0 and 108 nm≤R2≤168 nm (range corresponding to 138 nm±30 nm, where 138 nm is the optimal value) are satisfied.

TABLE 3

| Nzq | Nz2 | R2 (nm) |
|---|---|---|
| 1.00 | 0.35 | 186 |
| 1.10 | 0.25 | 169 |
| 1.20 | 0.15 | 154 |
| 1.30 | 0.10 | 148 |
| 1.40 | −0.05 | 134 |
| 1.50 | −0.15 | 127 |
| 1.60 | −0.30 | 118 |
| 1.70 | −0.45 | 111 |
| 2.00 | −1.00 | 94 |
| 2.30 | −1.65 | 81 |
| 2.40 | −1.90 | 78 |
| 2.50 | −2.15 | 75 |
| 2.90 | −3.20 | 66 |

It should be noted that the aforementioned embodiments may be employed in combination without departing from the spirit of the present invention.

Also, as described above, the liquid-crystal display device according to the present invention may or may not have a third-class birefringent layer.

Thus, the present invention also provides a liquid-crystal display device, comprising: a first polarizer; a first first-class birefringent layer whose in-plane phase difference is adjusted to a quarter wave; a liquid crystal cell provided with a pair of substrates facing each other; a second first-class birefringent layer whose Nz factor is substantially the same as the first first-class birefringent layer and whose in-plane phase difference is adjusted to a quarter wave; a second-class birefringent layer; and a second polarizer, all of which are stacked in this order, wherein an in-plane slow axis of the first first-class birefringent layer is at an angle of substantially 45° to an absorption axis of the first polarizer, an in-plane slow axis of the second first-class birefringent layer is substantially orthogonal to the in-plane slow axis of the first first-class birefringent layer, an absorption axis of the second polarizer is substantially orthogonal to the absorption axis of the first polarizer, an in-plane fast axis of the second-class birefringent layer is substantially orthogonal to the absorption axis of the second polarizer, and the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (12) and (13) below:

$$Rth\_c(B)/Rth\_c(G) > \Delta n\_LC(B)/\Delta n\_LC(G) \quad (12)$$

$$Rth\_c(R)/Rth\_c(G) < \Delta n\_LC(R)/\Delta n\_LC(G) \quad (13)$$

where $Rth\_c(B)$, $Rth\_c(G)$, and $Rth\_c(R)$ represents perpendicular phase difference of the liquid crystal cell at wavelengths of 450 nm, 550 nm, and 650 nm, respectively, and $\Delta n\_LC(B)$, $\Delta n\_LC(G)$, and $\Delta n\_LC(R)$ represent birefringence values of a liquid crystal material of the liquid crystal layer at wavelengths of 450 nm, 550 nm, and 650 nm, respectively.

As long as the first polarizer, first first-class birefringent layer, liquid crystal cell, second first-class birefringent layer, second-class birefringent layer, and second polarizer are included as components, the second liquid-crystal display device according to the present invention is not particularly limited by other members.

The second liquid-crystal display device according to the present invention has the same configuration as the first liquid-crystal display device according to the present invention described earlier except that there is no third-class birefringent layer between the first first-class birefringent layer and liquid crystal cell or between the liquid crystal cell and second first-class birefringent layer. Therefore, the second liquid-crystal display device according to the present invention can achieve effects and adopt preferable embodiments, both of which are similar to those of the first liquid-crystal display device according to the present invention, and so detailed description thereof will be omitted.

Examples of the second liquid-crystal display device according to the present invention include a circularly polarized VA liquid-crystal display device 400 shown in FIG. 20 and configured by stacking a first polarizer 410, a first quarter-wave plate (first-class birefringent layer) 420, a VA liquid crystal cell 430, a second quarter-wave plate 440, a second-class birefringent layer 445, and a second polarizer 450 in this order. That is, the liquid-crystal display device 400 shown in FIG. 20 is the same as the liquid-crystal display device 300 in FIG. 12 except that the former does not include a third-class birefringent layer. Incidentally, in FIG. 20, the arrows drawn on the first and second polarizers 410 and 450 indicate the orientations of the respective absorption axes, the arrows drawn on the first and second quarter-wave plates 420 and 440 indicate the orientations of the respective slow axes, the arrow drawn on the second-class birefringent layer 445 indicates the orientation of the fast axis, and the ellipsoids drawn on the VA liquid crystal cell 430 represent the shape of an optical indicatrix of the VA liquid crystal cell 430.

Furthermore, the present invention provides a liquid-crystal display device, comprising: a first polarizer; a first first-class birefringent layer whose in-plane phase difference is adjusted to a quarter wave; a liquid crystal cell provided with a pair of substrates facing each other; a second first-class birefringent layer whose Nz factor is substantially the same as the first first-class birefringent layer and whose in-plane phase difference is adjusted to a quarter wave; a second-class birefringent layer; and a second polarizer, all of which are stacked in this order, wherein the liquid-crystal display device further comprises at least one third-class birefringent layer at least one of between the first first-class birefringent layer and the liquid crystal cell and between the liquid crystal cell and the second first-class birefringent layer, an in-plane slow axis of the first first-class birefringent layer is at an angle of substantially 45° to an absorption axis of the first polarizer, an in-plane slow axis of the second first-class birefringent layer is substantially orthogonal to the in-plane slow axis of the first first-class birefringent layer, an absorption axis of the second polarizer is substantially orthogonal to the absorption axis of the first polarizer, an in-plane fast axis of the second-class birefringent layer is substantially orthogonal to the absorption axis of the second polarizer, and the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (14) and (15) below:

$$Rth\_t(B)/Rth\_t(G) > \Delta n\_LC(B)/\Delta n\_LC(G) \quad (14)$$

$$Rth\_t(R)/Rth\_t(G) < \Delta n\_LC(R)/\Delta n\_LC(G) \quad (15)$$

where Rth_t(B), Rth_t(G), and Rth_t(R) respectively represent sums of perpendicular phase difference of the liquid crystal cell at wavelengths of 450 nm, 550 nm, and 650 nm and the perpendicular phase difference of the third-class birefringent layer while Δn_LC(B), Δn_LC(G), and Δn_LC(R) represent birefringence values of a liquid crystal material of the liquid crystal layer at wavelengths of 450 nm, 550 nm, and 650 nm, respectively.

As long as the first polarizer, first first-class birefringent layer, liquid crystal cell, second first-class birefringent layer, second-class birefringent layer, third-class birefringent layer, and second polarizer are included as components, the third liquid-crystal display device according to the present invention is not particularly limited by other members.

The third liquid-crystal display device according to the present invention has the same configuration as the first liquid-crystal display device according to the present invention described earlier except that the former has at least one third-class birefringent layer at least one of between the first first-class birefringent layer and the liquid crystal cell and between the liquid crystal cell and the second first-class birefringent layer. Therefore, the third liquid-crystal display device according to the present invention can achieve effects and adopt preferable embodiments, both of which are similar to those of the first liquid-crystal display device according to the present invention, and so detailed description thereof will be omitted.

Examples of the third liquid-crystal display device according to the present invention include the liquid-crystal display device 300 shown in FIG. 12.

Advantageous Effects of the Invention

The first to third liquid-crystal display devices according to the present invention can achieve high contrast ratios in a wide range of viewing angles and reduce light leakage in wide ranges of viewing angles and wavelengths during black display.

BRIEF DESCRIPTION OF THE DRAWINGS

FIG. 1 is an exploded diagrammatic perspective view showing a circularly polarized VA liquid-crystal display device of the simplest configuration that includes neither a second-class birefringent layer nor a third-class birefringent layer.

FIG. 2(*b*) shows schematic views of the slow axis of the first quarter-wave plate and slow axis of the second quarter-wave plate that perpendicularly intersect each other in the front, as viewed from the front direction (upper) and as viewed obliquely at a 45-degree orientation (lower). FIG. 2(*c*) shows schematic views of an absorption axis of a first polarizer and absorption axis of a second polarizer that perpendicularly intersect each other in the front, as viewed from the front direction (upper) and as viewed obliquely at a 45-degree orientation (lower).

FIG. 3 is a diagram showing changes in polarization state of transmitted light upon passage through each object as projected onto an S1-S2 plane of the Poincare sphere when the circularly polarized VA liquid-crystal display device in FIG. 1 is observed from the front direction.

FIG. 4 is a diagram showing changes in the polarization state of transmitted light upon passage through each object as projected onto the S1-S2 plane of the Poincare sphere when the circularly polarized VA liquid-crystal display device 100 in FIG. 1 is observed obliquely at a 0-degree orientation, with a 60-degree tilt from a normal line.

FIG. 5 is an exploded diagrammatic perspective view showing a configuration of a circularly polarized VA liquid-crystal display device that includes a third-class birefringent layer.

FIG. 6 is a diagram showing changes in the polarization state of transmitted light upon passage through each object as projected onto the S1-S2 plane of the Poincare sphere when the circularly polarized VA liquid-crystal display device (Nzq=1.6, Rlc=320 nm, R3=−123 nm) in FIG. 5 is observed from the front direction.

FIG. 7 is a diagram showing changes in the polarization state of transmitted light upon passage through each object as projected onto the S1-S2 plane of the Poincare sphere when the circularly polarized VA liquid-crystal display device (Nzq=1.6, Rlc=320 nm, R3=−129 nm) in FIG. 5 is observed obliquely at a 0-degree orientation, with a 60-degree tilt from the normal line.

FIG. 8 is a diagram showing changes in the polarization state of transmitted light upon passage through each object as projected onto the S1-S2 plane of the Poincare sphere when the circularly polarized VA liquid-crystal display device (Nzq=2.0, Rlc=320 nm, R3=−61 nm) in FIG. 5 is observed obliquely at a 0-degree orientation, with a 60-degree tilt from the normal line.

FIG. 9 is a diagram showing changes in the polarization state of transmitted light upon passage through each object as projected onto the S1-S2 plane of the Poincare sphere when the circularly polarized VA liquid-crystal display device (Nzq=2.35, Rlc=320 nm, R3=0 nm) in FIG. 5 is observed obliquely at a 0-degree orientation, with a 60-degree tilt from the normal line.

FIG. 10 is a graph showing a relationship between an Nz factor Nzq of first and second quarter-wave plates and an optimal value of perpendicular phase difference R3 of the third-class birefringent layer in the circularly polarized VA liquid-crystal display device in FIG. 5.

FIG. 11 is a diagram showing changes in the polarization state of transmitted light upon passage through each object as projected onto the S1-S2 plane of the Poincare sphere when the circularly polarized VA liquid-crystal display device in FIG. 5 is observed obliquely at a 45-degree orientation, with a 60-degree tilt from the normal line.

FIG. 12 is an exploded diagrammatic perspective view showing a configuration of a circularly polarized VA liquid-crystal display device that includes a second-class birefringent layer and a third-class birefringent layer.

FIG. 13 is a diagram showing changes in the polarization state of transmitted light upon passage through each object as projected onto the S1-S2 plane of the Poincare sphere when the circularly polarized VA liquid-crystal display device (Nzq=1.6, Rlc=320 nm, R3=−129 nm, Nz2=−0.30, and R2=118 nm) in FIG. 12 is observed from the front direction.

FIG. 14 is a diagram showing changes in the polarization state of transmitted light upon passage through each object as projected onto the S1-S2 plane of the Poincare sphere when the circularly polarized VA liquid-crystal display device (Nzq=1.6, Rlc=320 nm, R3=−129 nm, Nz2=−0.30, and R2=118 nm) in FIG. 12 is observed obliquely at a 45-degree orientation, with a 60-degree tilt from the normal line.

FIG. 15 is a diagram showing changes in the polarization state of transmitted light upon passage through each object as projected onto the S1-S2 plane of the Poincare sphere when the circularly polarized VA liquid-crystal display device (Nzq=1.6, Rlc=320 nm, R3=−129 nm, Nz2=−0.30, and R2=118 nm) in FIG. 12 is observed obliquely at a 0-degree orientation, with a 60-degree tilt from the normal line.

FIG. 16 is a diagram showing changes in the polarization state of transmitted light upon passage through each object as projected onto the S1-S2 plane of the Poincare sphere when the circularly polarized VA liquid-crystal display device (Nzq=2.0, Rlc=320 nm, R3=−61 nm, Nz2=1.00, and R2=94 nm ) in FIG. 12 is observed obliquely at a 45-degree orientation, with a 60-degree tilt from the normal line.

FIG. 17 is a diagram showing changes in the polarization state of transmitted light upon passage through each object as projected onto the S1-S2 plane of the Poincare sphere when the circularly polarized VA liquid-crystal display device (Nzq=2.35, Rlc=320 nm, R3=0 nm, Nz2=−1.80, and R2=90 nm) in FIG. 12 is observed obliquely at a 45-degree orientation, with a 60-degree tilt from the normal line.

FIG. 18 is a graph showing a relationship between an Nz factor Nzq of first and second quarter-wave plates and an optimal value of an Nz factor Nz2 of a second-class birefringent layer in the circularly polarized VA liquid-crystal display device in FIG. 12.

FIG. 19 is a graph showing a relationship between the Nz factor Nzq of the first and second quarter-wave plates and an optimal value of in-plane phase difference P2 of the second-class birefringent layer in the circularly polarized VA liquid-crystal display device in FIG. 12.

FIG. 20 is an exploded diagrammatic perspective view showing a configuration of a circularly polarized VA liquid-crystal display device that includes a second-class birefringent layer.

FIG. 21 is a schematic sectional view showing a configuration of a liquid-crystal display device according to a first embodiment of the present invention.

FIG. 22 is a schematic sectional view showing a configuration of a liquid-crystal display device according to a second embodiment of the present invention.

FIG. 23 is a schematic sectional view showing a configuration of a liquid-crystal display device according to Example 2.

FIG. 24 is a schematic sectional view showing a configuration of a liquid-crystal display device according to Comparative Example 1.

FIG. 25(a) is an enlarged schematic diagram showing a cross section of moth-eye film and FIG. 25(b) is an explanatory diagram showing changes in a refractive index on an interface between the moth-eye film and an air layer.

FIG. 26 is an exploded diagrammatic perspective view showing a configuration that results when the moth-eye film is added to the circularly polarized VA liquid-crystal display device in FIG. 12.

FIG. 27 is an exploded diagrammatic perspective view showing a configuration that results when the moth-eye film is added to the circularly polarized VA liquid-crystal display device in FIG. 20.

MODES FOR CARRYING OUT THE INVENTION

The present invention will be mentioned in more detail in the following embodiments, but is not limited to these embodiments.

(First Embodiment of the Present Invention)

A first embodiment of a liquid-crystal display device resulting from application of the present invention will be described with reference to FIG. 21, which is a schematic sectional view showing a configuration of the liquid-crystal display device according to the first embodiment of the present invention.

Figure 21:
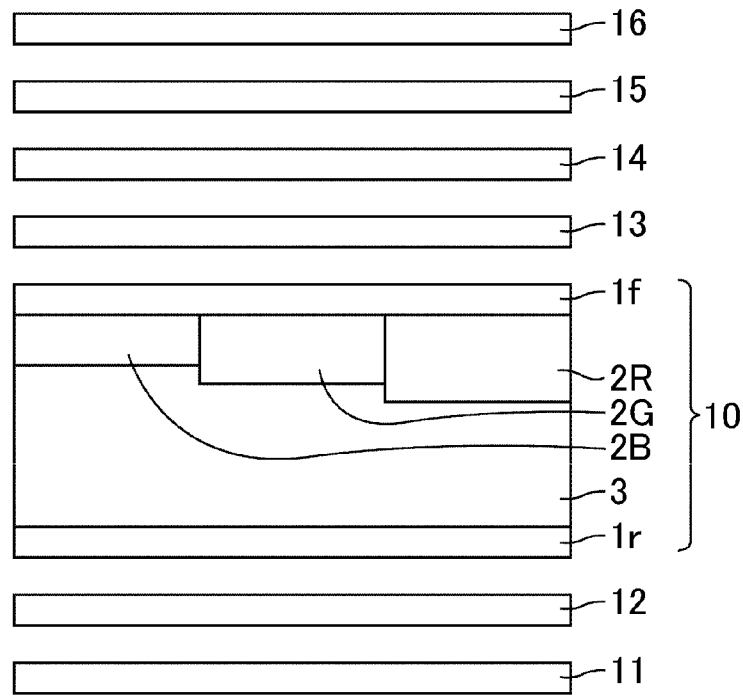
[FIG. 21]

As shown in FIG. 21, the liquid-crystal display device according to the first embodiment of the present invention is a circularly polarized VA liquid-crystal display device that includes a first polarizer 11, a first quarter-wave plate (first-class birefringent layer) 12, a VA liquid crystal cell 10, a third-class birefringent layer 13, a second quarter-wave plate 14, a second-class birefringent layer 15, and a second polarizer 16 stacked in this order.

The liquid crystal cell 10 includes first and second transparent substrates 1r and 1f, and a liquid crystal layer 3 containing liquid crystals enclosed between the transparent substrates 1r and 1f and aligned vertically to the transparent substrates 1r and 1f. Blue pixels, green pixels, and red pixels are arrayed in a predetermined order on the transparent substrate 1f, with a blue color filter layer 2B being placed on the blue pixels, a green color filter layer 2G being placed on the green pixels, and a red color filter layer 2R being placed on the red pixels. Three sub-pixels—blue, green, and red sub-pixels—placed adjacent to each other make up a single pixel, allowing various colors to be displayed. Incidentally, although in the first embodiment of the present invention (FIG. 21), the color filter layers 2B, 2G, and 2R are formed on the side of the second transparent substrate 1f, the color filter layers 2B, 2G, and 2R may be formed on the side of the first transparent substrate 11r.

(Second Embodiment of the Present Invention)

A second embodiment of a liquid-crystal display device resulting from application of the present invention will be described with reference to FIG. 22, which is a schematic sectional view showing a configuration of the liquid-crystal display device according to the second embodiment of the present invention.

Figure 22:
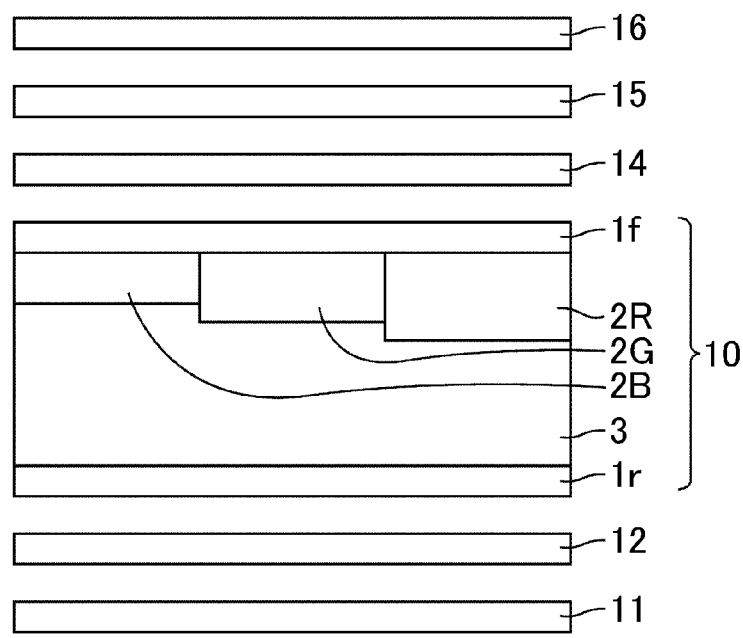
[FIG. 22]

As shown in FIG. 22, the liquid-crystal display device according to the second embodiment of the present invention is a circularly polarized VA liquid-crystal display device that includes a first polarizer 11, a first quarter-wave plate (first-class birefringent layer) 12, a VA liquid crystal cell 10, a second quarter-wave plate 14, a second-class birefringent layer 15, and a second polarizer 16 stacked in this order.

The second embodiment of the present invention is similar to the first embodiment except that no third-class birefringent layer is included, and thus detailed description thereof will be omitted.

Components of the first and second embodiments of the present invention will be described in detail below.

(Birefringent Layers)

Birefringent layers used in the present invention do not have their material and optical performance particularly limited, and may be made, for example, of a stretched polymer film, a liquid crystalline material whose alignment is fixed, a thin sheet of inorganic material, or the like. The formation method of the birefringent layers is not particularly limited. For example, solvent casting or melt extrusion may be used for birefringent layers formed of polymer film. Alternatively, multiple birefringent layers may be formed simultaneously by co-extrusion. The polymer film may be stretched or unstretched as long as desired phase difference is produced. There is no particular limit to stretching methods. Available stretching methods include tensile stretching between rolls, compression stretching between rolls, tenter transverse-uniaxial stretching, diagonal stretching, longitudinal and transverse biaxial stretching, and special stretching carried out under the contractile force of heat-shrinkable film. In the case of quarter-wave plates, in particular, since film needs to be stacked at an angle of substantially 45° relative to polarizers, making up a circularly polarizing plate, it is especially preferable to use diagonal stretching that involves stretching and orienting roll film obliquely with respect to its flow direction. In the case of birefringent layers formed of a liquid crystalline material, for example, available methods include a method that applies the liquid crystalline material to a base film subjected to aligning treatment and fixes the alignment. Alternatively, a method that does not apply a special aligning treatment to the base film or a method that removes liquid crystalline material from the base film after the alignment is fixed and transfers the liquid crystalline material to another film may be used as long as desired phase difference is produced. Furthermore, a method that does not fix the alignment of the liquid crystalline material may be used. Besides, the same formation method as birefringent layers formed of a liquid crystalline material may be used for birefringent layers formed of a non-liquid crystalline material. Formation methods will be described more specifically below according to the type of birefringent layer.

(First-class Birefringent Layers: First and Second Quarter-wave Plates)

For the first-class birefringent layers, a film containing a material with positive intrinsic birefringence as a constituent or a similar film may be used as appropriate after stretching. Examples of materials whose intrinsic birefringence is positive include polycarbonate, polysulfone, polyether sulfone, polyethylene terephthalate, polyethylene, polyvinyl alcohol, norbornene, triacetyl cellulose, and diacetyl cellulose.

(Second-class Birefringent Layer)

For the second-class birefringent layer, a film containing a material with negative intrinsic birefringence as a constituent, a film containing a material with positive intrinsic birefringence as a constituent, or a similar film may be used as appropriate, where the film containing a material with negative intrinsic birefringence is used after stretching and the film containing a material with positive intrinsic birefringence is used by being stretched under the contractile force of heat-shrinkable film. Among other things, from the viewpoint of simplifying the manufacturing method, preferably a film containing a material with negative intrinsic birefringence as a constituent is used after stretching. Examples of materials whose intrinsic birefringence is negative include a resin composition containing an acrylic resin and styrene resin, polystyrene, polyvinyl naphthalene, polyvinyl biphenyl, polyvinyl pyridine, polymethyl methacrylate, polymethyl acrylate, N-substituted maleimide copolymer, polycarbonate having a fluorene skeleton, and triacetyl cellulose (especially, with a low degree of acetylation). Above all, a resin composition containing an acrylic resin and styrene resin is preferable in terms of optical characteristics, productivity, and heat resistance. A manufacturing method for a film containing such a resin composition as constituents is disclosed, for example, in JP 2008-146003A.

(Third-class Birefringent Layer)

For the third-class birefringent layer, a film containing a material with positive intrinsic birefringence as a constituent may be used after being processed by longitudinal and transverse biaxial stretching, after being coated with a liquid crystalline material such as cholesteric (chiral nematic) liquid crystal or discotic liquid crystal, after being coated with a non-liquid crystalline material containing polyimide, polyamide, or the like, or after a similar treatment, as appropriate.

(Polarizers)

The polarizers can be made, for example, of a polyvinyl alcohol (PVA) film with a dichroic anisotropic material such as an iodine complex absorbed and aligned therein, or other similar film as appropriate.

(Liquid Crystal Cell)

The liquid crystal cell 10 uses a so-called MVA mode (multi-domain VA mode) in which the liquid crystal molecules in the pixel are divided in terms of tilt direction into multiple domains. The MVA liquid crystal cell creates a black display by aligning the liquid crystal molecules in the liquid crystal layer 3 vertically to the substrate surface. Available methods for driving the liquid crystal cell include a TFT method (active-matrix method), simple-matrix method (passive-matrix method), and plasma-addressing method. In a possible configuration of the liquid crystal cell 10, for example, the liquid crystal layer 3 is interposed between a pair of substrates, an electrode is formed on each of the substrates, and a voltage is applied between the electrodes to create a display. Conventional material such as glass may be used, as appropriate, for the transparent substrates $1r$ and $1f$. Also, regarding the liquid crystal layer 3, conventional material such as nematic liquid crystal with a negative dielectric anisotropy may be used, as appropriate. Vertical alignment can be implemented using a vertical alignment layer (not shown) typically made of polyimide.

Conventional color filter layers may be used, as appropriate, for the color filter layers 2B, 2G, and 2R. For example, pigment-dispersed color filter layers may be used. In the first and second embodiments of the present invention (FIGS. 21 and 22), the thicknesses of the color filter layers are set as follows: "thickness of the blue color filter layer 2B"<"thickness of the green color filter layer 2G"<"thickness of the red color filter layer 2G." As a result, the thickness of the liquid crystal layer 3 satisfies the relationship: "thickness of the liquid crystal layer 3 in the region containing red pixels"<"thickness of the liquid crystal layer 3 in the region containing green pixels"<"thickness of the liquid crystal layer 3 in the region containing blue pixels." The relationship has been determined to optimize wavelength dispersion of the sum of the perpendicular phase difference of the liquid crystal cell 10 and perpendicular phase difference of the third-class birefringent layer 13 as described later. Therefore, in the first embodiment of the present invention, as long as the wavelength dispersion of the sum of the perpendicular phase difference of the liquid crystal cell 10 and perpendicular phase difference of the third-class birefringent layer 13 satisfies at least one of expressions (14) and (15) above, the relationship in the thickness of the liquid crystal layer 3 among the sub-pixels of different colors is not limited to the one described above. Also, in the second embodiment of the present invention, as long as the wavelength dispersion of the perpendicular phase difference of the liquid crystal cell 10 satisfies at least one of expressions (12) and (13) above, the relationship in the thickness of the liquid crystal layer 3 among the sub-pixels of different colors is not limited to the one described above. This is because the optimal thickness of the liquid crystal layer 3 varies with the phase difference of the color filter layers 2B, 2G, and 2R, the wavelength dispersion of the phase difference of the color filter layers 2B, 2G, and 2R, the wavelength dispersion of the birefringence of the liquid crystal material of the liquid crystal layer 3, and the wavelength dispersion of the third-class birefringent layer.

Incidentally, although in the first and second embodiments of the present invention, the thickness of the liquid crystal layer 3 is adjusted by adjusting the thicknesses of the color filter layers 2B, 2G, and 2R among the pixels of different colors, the thickness of the liquid crystal layer 3 may be adjusted by separately providing a thickness adjustment layer made of transparent material, with the thicknesses of the color filter layers 2B, 2G, and 2R kept constant among the pixels of different colors. Of course, the thickness of the liquid crystal layer 3 may be adjusted by varying the thicknesses of both the color filter layers 2B, 2G, and 2R and thickness adjustment layer among the pixels of different colors.

Incidentally, corresponding conventional components may be used, as appropriate, for the components (alignment layers, transparent electrodes, TFT elements, metal wiring, etc.) of the liquid crystal cell omitted in the above description and illustration.

Next, the phase difference of the liquid crystal cell 10 will be described. Based on studies conducted by the inventor, it is known that conventional color filter layers generally have C-plate phase difference. The C-plate phase difference is phase difference that satisfies the relationship $nx \cong ny \neq nz$ and has an optic axis in the out-of-plane direction, where nx and ny are principal indices of refraction in the in-plane direction (x direction and y direction) while nz is a principal index of refraction in the out-of-plane direction (z direction). Since birefringence does not occur in response to ray incidence from the z direction, optical characteristics are not affected when the liquid-crystal display device is viewed in the direction of the normal line, but the optical characteristics are affected when the liquid-crystal display device is viewed in oblique direction. Also, the C-plates are sometimes classified into positive C-plates and negative C-plates according to whether the value of an extraordinary index minus an ordinary index is positive or negative. That is, the C-plate that satisfies $nx \cong ny < nz$ is a positive C-plate while the C-plate that satisfies $nx \cong ny > nz$ is a negative C-plate. Color regions of the color filter layers are generally formed by applying coloring compounds to the transparent substrate on the viewing side. Each coloring compound is made of a transparent resin binder and coloring matter such as a pigment. Examples of methods for adjusting the phase difference of the color filter layers include a method that involves controlling the type and viscosity of solvent during application of a binder-pigment mixture, a method that involves controlling the birefringence of the binder resin material itself, and a method that involves controlling the thicknesses of the color filter layers.

The perpendicular phase difference Rth of the liquid crystal layer 3 is given by the product $\Delta n \times d$ of the birefringence $\Delta n$ of liquid crystal and cell thickness d when the alignment of the liquid crystal layer 3 is vertical alignment. If $\Delta n(B)$, $\Delta n(G)$, and $\Delta n(R)$ represent birefringence of the liquid crystal at wavelengths of 450 nm, 550 nm, and 650 nm, respectively, in the case of typical liquid crystal material, $\Delta n(B)/\Delta n(G)=1.05$ and $\Delta n(R)/\Delta n(G)=0.97$. Thus, if a conventional liquid crystal cell is produced by setting the cell thickness, for example, at d=3.4 µm, the wavelength dispersions of Rth of the liquid crystal layer are Rth(B)/Rth(G)=1.05 and Rth(R)/Rth(G)=0.97.

On the other hand, if the thickness of the liquid crystal layer 3 is adjusted among the pixels of different colors by adjusting the thicknesses of the color filter layers among the pixels of different colors, relative relationships among the perpendicular phase difference Rth_c(B), perpendicular phase difference Rth_c(G), and perpendicular phase difference Rth_c(R) of the liquid crystal cell 10 can be adjusted as desired. Moreover, if the thickness of the liquid crystal layer 3 is adjusted among the pixels of different colors by taking into consideration the wavelength dispersion characteristics of the third-class birefringent layer 13, the conditions of expressions (12) to (15) needed to achieve the effects of the present invention can be satisfied.

An evaluation method will be described in detail below.
(Method for Measuring R, Rth, Nz Factor, nx, ny, and nz)

A dual-rotating retarder polarimeter (produced by Axometrics Inc. under the trade name of Axo-scan) was used for measurements. The in-plane phase difference R was actually measured in the direction normal to the birefringent layers. The principal indices of refraction nx, ny, and nz, the perpendicular phase difference Rth, and the Nz factor were measured in the direction normal to the birefringent layers. The phase difference was measured in directions tilted by −50° to 50° from the direction of the normal line. Then, calculations were performed by curve fitting using a known equation of an optical indicatrix. The tilting orientation was orthogonal to the in-plane slow axis. Also, although nx, ny, and nz as well as Rxz and Nz depend on the average index of refraction (=(nx+ny+nz)/3) given as a calculation condition of curve fitting, calculations were performed by standardizing the average index of refraction of every birefringent layer to 1.5. Regarding a birefringent layer whose average index of refraction is not actually 1.5, a conversion was carried out by assuming that average index of refraction is 1.5.

(Method for Measuring Contrast Ratio Vs. Viewing Angle Characteristics of Liquid-Crystal Display Device)

A viewing angle measuring instrument (produced by ELDIM Co. under the trade name of EZ Contrast 160) was used for measurements. As a light source, the backlight mounted on a liquid crystal television (LC-42GX3W made by Sharp Corporation) produced by Sharp Corporation was used. Brightness of white display and black display observed obliquely at a 45-degree orientation, with a 60-degree tilt from the normal line was measured and the brightness ratio between the white display and black display was designated as CR (45, 60). Also, brightness of white display and black display observed obliquely at a 0-degree orientation, with a 60-degree tilt from the normal line was measured and the brightness ratio between the white display and black display was designated as CR (0, 60).

(Method for Measuring Chromaticity Viewing Angle of Liquid-crystal Display Device)

A viewing angle measuring instrument (produced by ELDIM Co. under the trade name of EZ Contrast 160) was used for measurements. As a light source, the backlight mounted on a liquid crystal television produced by Sharp Corporation (under the trade name of LC37-GH1) was used. A u'v' chromaticity point of black display observed from the front direction (with a 0-degree tilt from the normal line) and a u'v' chromaticity point of black display observed obliquely at a 45-degree orientation, with a 60-degree tilt from the normal line were measured and the distance between the two points was designated as ΔE (45, 60). Also, a u'v' chromaticity point of black display observed from the front direction (with a 0-degree tilt from the normal line) and a u'v' chromaticity point of black display observed obliquely at a 0-degree orientation, with a 60-degree tilt from the normal line were measured and the distance between the two points was designated as ΔE (0, 60).

The present invention will be described in more detail below with reference to examples, but the present invention is not limited to these examples.

Also, the material names, axis angles, in-plane phase difference R, perpendicular phase difference Rth or Rlc, and Nz factor of the polarizers, birefringent layers, and liquid crystal cell in each example are shown in Table 4 below. In Table 4, the axis of each birefringent layer is defined in terms of the orientation angle of the in-plane slow axis while the axis of each polarizer is defined in terms of the orientation angle of the absorption axis. Incidentally, although the in-plane slow axis of the second-class birefringent layer is important in design, in Table 4, the axis of the second-class birefringent layer is defined in terms of the orientation angle of the in-plane slow axis as with the other birefringent layers. The in-plane fast axis of the second-class birefringent layer is orthogonal to the in-plane slow axis of the second-class birefringent layer. Also, in Table 4, the following abbreviations are used for the material names of the birefringent layers.
NB: norbornene
ChLC: cholesteric liquid crystal
PI: polyimide
TAC: triacetyl cellulose
A: resin composition containing acrylic resin and styrene resin

EXAMPLE 1

The liquid-crystal display device according to the first embodiment of the present invention was actually produced and used as Example 1. Various parameters including optical parameters (phase difference and wavelength dispersion thereof) are summarized in Tables 4 and 5 together with those of other examples.

EXAMPLE 2

The liquid-crystal display device according to the second embodiment of the present invention was actually produced and used as Example 2. Various parameters including optical parameters (phase difference and wavelength dispersion thereof) are summarized in Tables 4 and 5 together with those of other examples.

EXAMPLE 3

Figure 23:
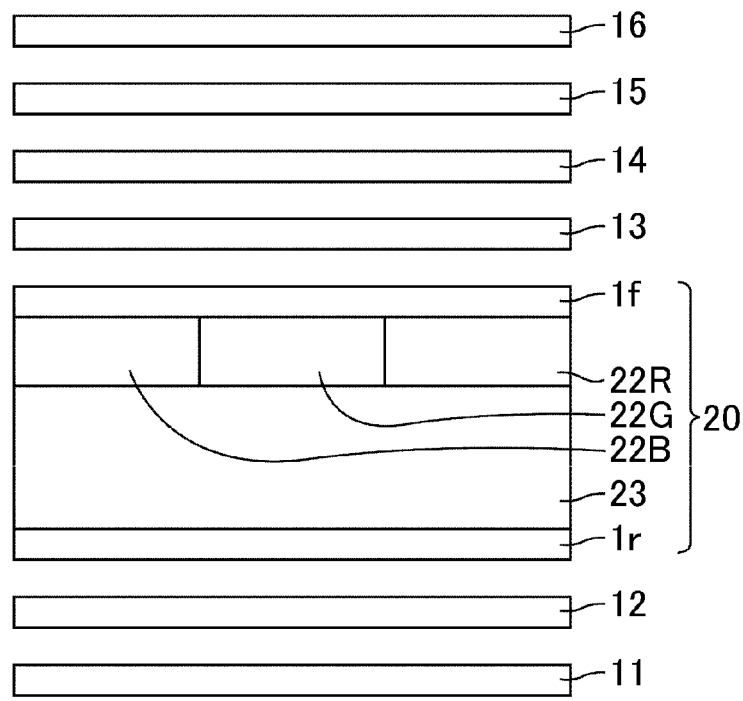
[FIG. 23]

FIG. 23 is a schematic sectional view showing a configuration of the liquid-crystal display device according to Example 2. A liquid-crystal display device according to Example 3 was created based on the liquid-crystal display device according to Example 1 by changing the thicknesses and phase difference of the color filter layers of the liquid crystal cell as well as the wavelength dispersion characteristics of the sum of the perpendicular phase difference of the liquid crystal cell and perpendicular phase difference of the third-class birefringent layer, but was otherwise the same as the liquid-crystal display device according to Example 1. More specifically, blue pixels, green pixels, and red pixels were arrayed in a predetermined order on the transparent substrate 1f, with a blue color filter layer 22B being placed on the blue pixels, a green color filter layer 22G being placed on the green pixels, and a red color filter layer 22R being placed on the red pixels. The thicknesses of the color filter layers were set as follows: "thickness of the blue color filter layer 22B"="thickness of the green color filter layer 22G"="thickness of the red color filter layer 22G." As a result, the thickness of the liquid crystal layer 23 was set to be constant among the pixels of different colors. On the other hand, the relative relationships among the perpendicular phase difference Rth_c(B), perpendicular phase difference Rth_c(G), and perpendicular phase difference Rth_c(R) of the liquid crystal cell 10 were adjusted by adjusting the phase difference of the color filter layers among the pixels of different colors. Various parameters including optical parameters (phase difference and wavelength dispersion thereof) are summarized in Tables 4 and 5 together with those of other examples.

EXAMPLE 4

A liquid-crystal display device according to Example 4 was created based on the liquid-crystal display device according to Example 1 by changing the thicknesses and phase difference of the color filter layers of the liquid crystal cell as well as the wavelength dispersion characteristics of the sum of the perpendicular phase difference of the liquid crystal cell and perpendicular phase difference of the third-class birefringent layer, but was otherwise the same as the liquid-crystal display device according to Example 1. Various parameters including optical parameters (phase difference and wavelength dispersion thereof) are summarized in Tables 4 and 5 together with those of other examples.

EXAMPLE 5

A liquid-crystal display device according to Example 5 was created based on the liquid-crystal display device according to Example 1 by changing the thicknesses and phase difference of the color filter layers of the liquid crystal cell as well as the wavelength dispersion characteristics of the sum of the perpendicular phase difference of the liquid crystal cell and perpendicular phase difference of the third-class birefringent layer, but was otherwise the same as the liquid-crystal display device according to Example 1. Various parameters including optical parameters (phase difference and wavelength dispersion thereof) are summarized in Tables 4 and 5 together with those of other examples.

COMPARATIVE EXAMPLE 1

Figure 24:
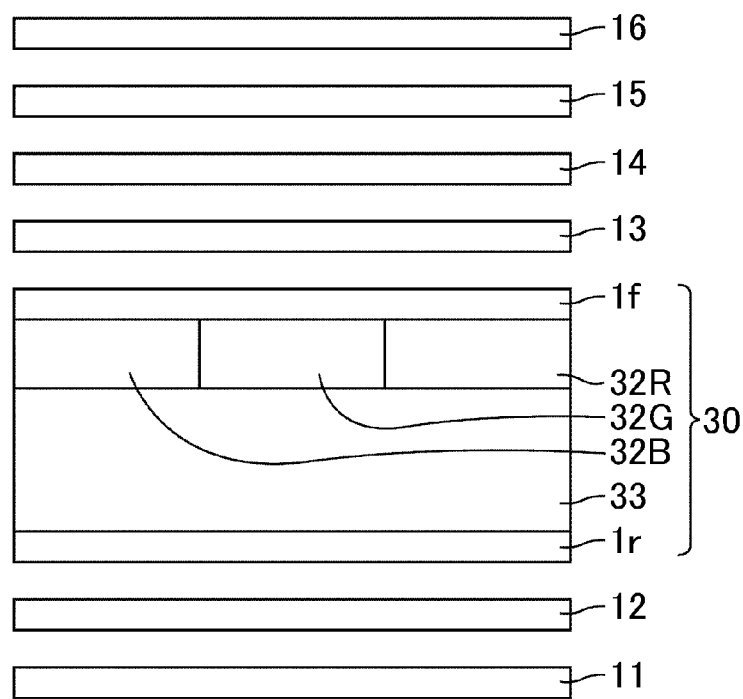
[FIG. 24]

FIG. 24 is a schematic sectional view showing a configuration of a liquid-crystal display device according to Comparative Example 1. The liquid-crystal display device according to Comparative Example 1 was created based on the liquid-crystal display device according to Example 1 by changing the thicknesses of the color filter layers of the liquid crystal cell as well as the wavelength dispersion characteristics of the sum of the perpendicular phase difference of the liquid crystal cell and perpendicular phase difference of the third-class birefringent layer, but was otherwise the same as the liquid-crystal display device according to Example 1. More specifically, blue pixels, green pixels, and red pixels were arrayed in a predetermined order on the transparent substrate 1f, with a blue color filter layer 32B being placed on the blue pixels, a green color filter layer 32G being placed on the green pixels, and a red color filter layer 32R being placed on the red pixels. The thicknesses of the color filter layers were set as follows: "thickness of the blue color filter layer 32B"="thickness of the green color filter layer 32G"="thickness of the red color filter layer 32G." As a result, the thickness of the liquid crystal layer 33 was set to be constant among the pixels of different colors. However, the phase difference of the color filter layers was not adjusted. Various parameters including optical parameters (phase difference and wavelength dispersion thereof) are summarized in Tables 4 and 5 together with those of other examples.
(Evaluation Results)

Measurement results of the optical parameters (phase difference and wavelength dispersion thereof), contrast viewing angle, and chromaticity viewing angle in the examples and comparative example are shown in Tables 4 and 5. As can be seen from the evaluation results shown in Table 5, it was found that the liquid-crystal display devices according to Examples 1 to 5 of the present invention were superior in display performance to the liquid-crystal display device according to Comparative Example 1, with CR(45, 60) and CR(0, 60) being equal or better and ΔE(0, 60) being smaller. That is, it was demonstrated that the present invention can provide a high-quality liquid-crystal display device capable of achieving high contrast ratios in a wide range of viewing angles without coloration.

TABLE 4

|  | Optical material | Material | Axis angle [°] | Phase difference R [nm] B | G | R | Phase difference Rth or Rlc [nm] B | G | R | Nz factor |
|---|---|---|---|---|---|---|---|---|---|---|
| Example 1 | Second polarizing element | | 0 | | | | | | | |
| | Second-class birefringent layer | A | 0 | 124 | 118 | 114 | | | | −0.3 |
| | Second quarter-wave plate | NB | 45 | 139 | 138 | 138 | 153 | 152 | 152 | 1.6 |
| | Third-class birefringent layer | PI | 0 | | | | −119 | −112 | −108 | |
| | VA-mode liquid crystal cell (3.7 μm, 3.4 μm, 3.3 μm) | Liquid crystal layer | | | | | 371 | 325 | 304 | |
| | | CF, etc. | | | | | 0 | 0 | 0 | |
| | First quarter-wave plate | NB | 135 | 139 | 138 | 138 | 153 | 152 | 152 | 1.6 |
| | First polarizing element | | 90 | | | | | | | |
| Example 2 | Second polarizing element | | 0 | | | | | | | |
| | Second-class birefringent layer | A | 0 | 75 | 71 | 68 | | | | −1.65 |
| | Second quarter-wave plate | NB | 45 | 139 | 138 | 138 | 153 | 152 | 152 | 1.6 |
| | VA-mode liquid crystal cell (3.7 μm, 3.4 μm, 3.3 μm) | Liquid crystal layer | | | | | 371 | 325 | 304 | |
| | | CF, etc. | | | | | 0 | 0 | 0 | |
| | First quarter-wave plate | NB | 135 | 139 | 138 | 138 | 153 | 152 | 152 | 1.6 |
| | First polarizing element | | 90 | | | | | | | |
| Example 3 | Second polarizing element | | 0 | | | | | | | |
| | Second-class birefringent layer | A | 0 | 124 | 118 | 114 | | | | −0.3 |
| | Second quarter-wave plate | NB | 45 | 139 | 138 | 138 | 153 | 152 | 152 | 1.6 |
| | Third-class birefringent layer | PI | 0 | | | | −119 | −112 | −108 | |
| | VA-mode liquid crystal cell (3.4 μm, 3.4 μm, 3.4 μm) | Liquid crystal layer | | | | | 341 | 325 | 314 | |
| | | CF, etc. | | | | | 22 | 0 | −10 | |
| | First quarter-wave plate | NB | 135 | 139 | 138 | 138 | 153 | 152 | 152 | 1.6 |
| | First polarizing element | | 90 | | | | | | | |
| Example 4 | Second polarizing element | | 0 | | | | | | | |
| | Second-class birefringent layer | A | 0 | 124 | 118 | 114 | | | | −0.3 |
| | Second quarter-wave plate | NB | 45 | 139 | 138 | 138 | 153 | 152 | 152 | 1.6 |
| | Third-class birefringent layer | PI | 0 | | | | −119 | −112 | −108 | |
| | VA-mode liquid crystal cell (3.2 μm, 3.4 μm, 3.5 μm) | Liquid crystal layer | | | | | 321 | 325 | 324 | |
| | | CF, etc. | | | | | 41 | 0 | −22 | |
| | First quarter-wave plate | NB | 135 | 139 | 138 | 138 | 153 | 152 | 152 | 1.6 |
| | First polarizing element | | 90 | | | | | | | |
| Example 5 | Second polarizing element | | 0 | | | | | | | |
| | Second-class birefringent layer | A | 0 | 124 | 118 | 114 | | | | −0.3 |
| | Second quarter-wave plate | NB | 45 | 139 | 138 | 138 | 153 | 152 | 152 | 1.6 |
| | Third-class birefringent layer | PI | 0 | | | | −119 | −112 | −108 | |
| | VA-mode liquid crystal cell (3.6 μm, 3.4 μm, 3.1 μm) | Liquid crystal layer | | | | | 361 | 325 | 290 | |
| | | CF, etc. | | | | | −5 | 0 | 8 | |
| | First quarter-wave plate | NB | 135 | 139 | 138 | 138 | 153 | 152 | 152 | 1.6 |
| | First polarizing element | | 90 | | | | | | | |
| Comparative Example 1 | Second polarizing element | | 0 | | | | | | | |
| | Second-class birefringent layer | A | 0 | 124 | 118 | 114 | | | | −0.3 |
| | Second quarter-wave plate | NB | 45 | 139 | 138 | 138 | 153 | 152 | 152 | 1.6 |
| | Third-class birefringent layer | PI | 0 | | | | −119 | −112 | −108 | |
| | VA-mode liquid crystal cell (3.4 μm, 3.4 μm, 3.4 μm) | Liquid crystal layer | | | | | 341 | 325 | 314 | |
| | | CF, etc. | | | | | 0 | 0 | 0 | |
| | First quarter-wave plate | NB | 135 | 139 | 138 | 138 | 153 | 152 | 152 | 1.6 |
| | First polarizing element | | 90 | | | | | | | |

TABLE 5

| | | B | G | R | CR viewing angle CR (45, 60) | CR (0, 60) | Chromaticity viewing angle ΔE (45, 60) | ΔE (0, 60) |
|---|---|---|---|---|---|---|---|---|
| Example 1 | Δn of liquid crystal | 0.100 | 0.096 | 0.092 | 35 | 178 | 0.057 | 0.012 |
| | Δn/Δn (G) | 1.05 | 1.00 | 0.97 | | | | |
| | Cell thickness d (μm) | 3.7 | 3.4 | 3.3 | | | | |
| | Rth of liquid crystal (nm) | 371 | 325 | 304 | | | | |

TABLE 5-continued

|  |  | B | G | R | CR (45, 60) | CR (0, 60) | ΔE (45, 60) | ΔE (0, 60) |
|---|---|---|---|---|---|---|---|---|
|  | Rth/Rth (G) of liquid crystal | 1.14 | 1.00 | 0.94 |  |  |  |  |
|  | Rth of third-class birefringent layer (nm) | −119 | −112 | −108 |  |  |  |  |
|  | Rth all (nm) | 252 | 213 | 197 |  |  |  |  |
|  | Rth all/Rth all (G) | 1.19 | 1.00 | 0.92 |  |  |  |  |
| Example 2 | Δn of liquid crystal | 0.100 | 0.096 | 0.092 | 34 | 176 | 0.060 | 0.014 |
|  | Δn/Δn (G) | 1.05 | 1.00 | 0.97 |  |  |  |  |
|  | Cell thickness d (μm) | 3.7 | 3.4 | 3.3 |  |  |  |  |
|  | Rth of liquid crystal (nm) | 371 | 325 | 304 |  |  |  |  |
|  | Rth/Rth (G) of liquid crystal | 1.14 | 1.00 | 0.94 |  |  |  |  |
| Example 3 | Δn of liquid crystal | 0.100 | 0.096 | 0.092 | 36 | 178 | 0.055 | 0.010 |
|  | Δn/Δn (G) | 1.05 | 1.00 | 0.97 |  |  |  |  |
|  | Cell thickness d (μm) | 3.4 | 3.4 | 3.4 |  |  |  |  |
|  | Rth of liquid crystal (nm) | 363 | 325 | 304 |  |  |  |  |
|  | Rth/Rth (G) of liquid crystal | 1.12 | 1.00 | 0.93 |  |  |  |  |
|  | Rth of third-class birefringent layer (nm) | −119 | −112 | −108 |  |  |  |  |
|  | Rth all (nm) | 244 | 213 | 196 |  |  |  |  |
|  | Rth all/Rth all (G) | 1.15 | 1.00 | 0.92 |  |  |  |  |
| Example 4 | Δn of liquid crystal | 0.100 | 0.096 | 0.092 | 37 | 177 | 0.053 | 0.015 |
|  | Δn/Δn (G) | 1.05 | 1.00 | 0.97 |  |  |  |  |
|  | Cell thickness d (μm) | 3.2 | 3.4 | 3.5 |  |  |  |  |
|  | Rth of liquid crystal (nm) | 362 | 325 | 302 |  |  |  |  |
|  | Rth/Rth (G) of liquid crystal | 1.11 | 1.00 | 0.93 |  |  |  |  |
|  | Rth of third-class birefringent layer (nm) | −119 | −112 | −108 |  |  |  |  |
|  | Rth all (nm) | 243 | 213 | 195 |  |  |  |  |
|  | Rth all/Rth all (G) | 1.14 | 1.00 | 0.92 |  |  |  |  |
| Example 5 | Δn of liquid crystal | 0.100 | 0.096 | 0.092 | 37 | 180 | 0.057 | 0.011 |
|  | Δn/Δn (G) | 1.05 | 1.00 | 0.97 |  |  |  |  |
|  | Cell thickness d (μm) | 3.6 | 3.4 | 3.1 |  |  |  |  |
|  | Rth of liquid crystal (nm) | 356 | 325 | 298 |  |  |  |  |
|  | Rth/Rth (G) of liquid crystal | 1.10 | 1.00 | 0.92 |  |  |  |  |
|  | Rth of third-class birefringent layer (nm) | −119 | −112 | −108 |  |  |  |  |
|  | Rth all (nm) | 237 | 213 | 190 |  |  |  |  |
|  | Rth all/Rth all (G) | 1.11 | 1.00 | 0.89 |  |  |  |  |
| Comparative Example 1 | Δn of liquid crystal | 0.100 | 0.096 | 0.092 | 34 | 176 | 0.072 | 0.088 |
|  | Δn/Δn (G) | 1.05 | 1.00 | 0.97 |  |  |  |  |
|  | Cell thickness d (μm) | 3.4 | 3.4 | 3.4 |  |  |  |  |
|  | Rth of liquid crystal (nm) | 341 | 325 | 314 |  |  |  |  |
|  | Rth/Rth (G) of liquid crystal | 1.10 | 1.00 | 0.92 |  |  |  |  |
|  | Rth of third-class birefringent layer (nm) | −119 | −112 | −108 |  |  |  |  |
|  | Rth all (nm) | 222 | 213 | 206 |  |  |  |  |
|  | Rth all/Rth all (G) | 1.04 | 1.00 | 0.97 |  |  |  |  |

The liquid-crystal display devices in the above examples have a circularly polarizing plate made up of a combination of a linearly polarizing plate (second polarizing element) and quarter-wave plate on both sides of the liquid crystal cell, and thereby create displays in circularly polarized VA mode. The circularly polarized VA mode, which has a transmittance improvement effect and antireflection effect is useful in improving the contrast ratio. By the action of the circularly polarizing plates, the antireflection function of the circularly polarized VA mode prevents so-called internally reflected light from getting out of the liquid-crystal display device, where the internally reflected light is the light reflected inside the liquid-crystal display device after entering the liquid-crystal display device from around the liquid-crystal display device. Therefore, the circularly polarized VA mode makes it difficult for the light reflected by surfaces of the black matrix, wiring, electrodes, and the like in the liquid crystal cell to get out of the liquid-crystal display device, and thereby prevents the contrast ratio of the liquid-crystal display device from falling especially in bright surroundings (high ambient light environment).

On the other hand, the reflected lights that can lower the contrast ratio of the liquid-crystal display device in high ambient light environments include surface-reflected light, i.e., light reflected from the surface of the liquid-crystal display device without entering the liquid-crystal display device from around the liquid-crystal display device, in addition to the internally reflected light described above. With the circularly polarized VA liquid-crystal display device, since the internally reflected light is reduced, the amount of surface-reflected light has a marked impact on the viewability of the display screen. Therefore, if measures are taken to reduce the surface-reflected light of the circularly polarized VA liquid-crystal display device, very high contrast ratios can be obtained in high ambient light environments, allowing the viewer of the display screen to experience marked improvements in display quality.

Figure 25:
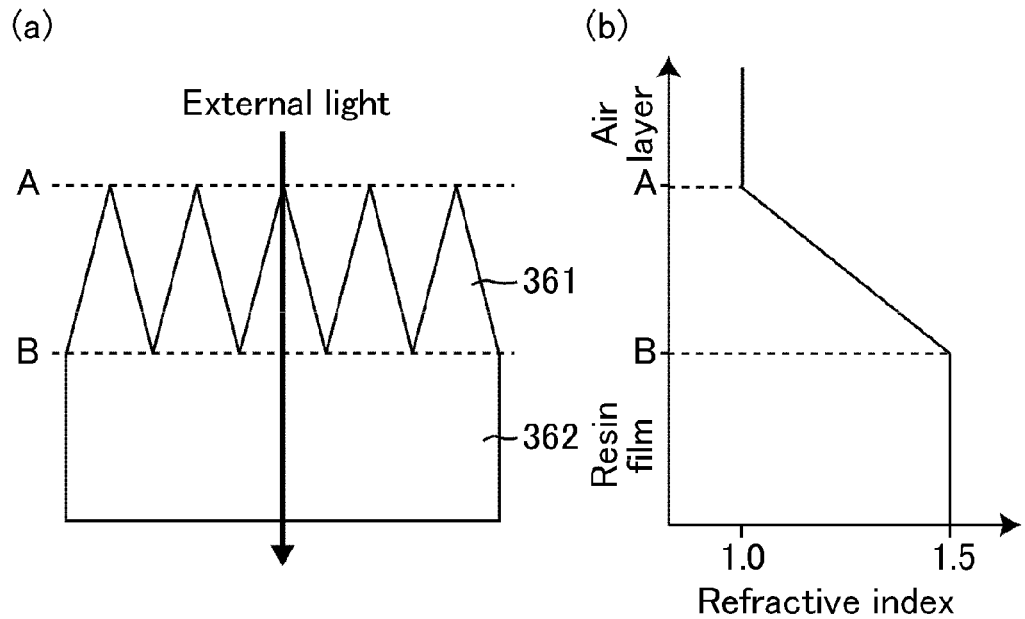
[FIG. 25]

Examples of antireflection films used to reduce surface reflection include an antireflection film formed by stacking multiple films with different refractive indices and an antireflection film that has fine projections and depressions formed on a surface. Above all, a "moth-eye film," which is a type of the latter antireflection film, has a structure in which a large number of projections smaller than the wavelengths (380 to 780 nm) of visible light are formed, offering an outstanding effect in reducing surface reflection. As shown in FIG. 25(a), light incident upon the moth-eye film reaches film base 362 through the fine projections 361 provided on the surface. Consequently, a region (region between A and B in FIG. 25(a)) which is located between an air layer and the film base and in which the projections and air layer coexist can be regarded to have a refractive index intermediate between the refractive index (somewhere around 1.5 in the case of a resin film) of film material and refractive index (1.0) of air. That is, as shown in FIG. 25(b), with changes in the volume ratio between the projections and air layer, the refractive index of this region increases gradually from the refractive index of air in contact with the film surface to the refractive index of the film material within a range shorter than the wavelengths of visible light. Consequently, the light incident upon the moth-eye film no longer recognize an air-film interface as an interface at which the refractive index changes. This makes it possible to greatly reduce light reflected from the interface. With the moth-eye film, the air-film interface can reduce surface reflectance to, for example, somewhere around 0.15%.

Figure 1:
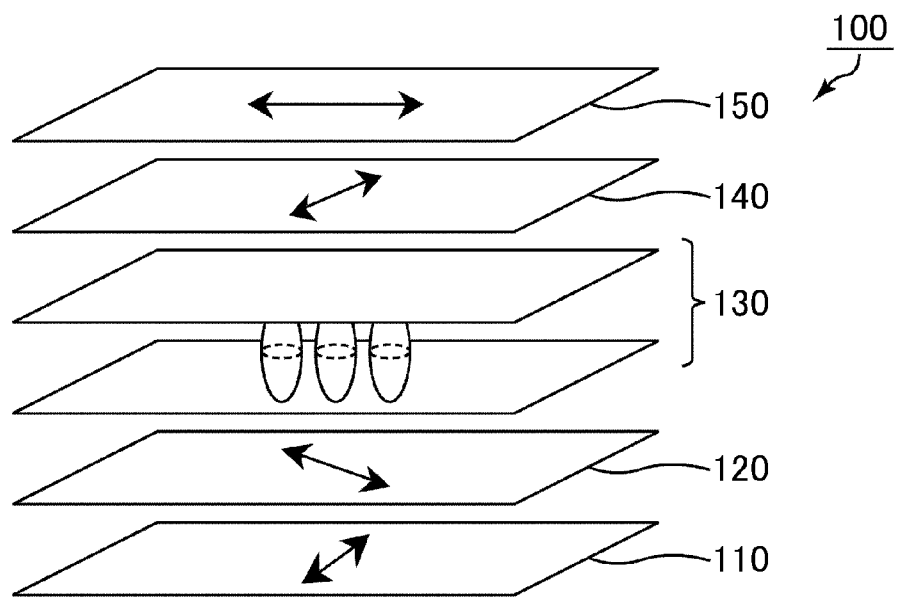
[FIG. 1]
Figure 2:
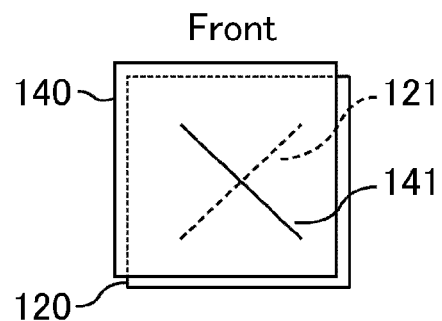
[FIG. 2] FIG. 2(*a*) shows schematic views of a slow axis of a first quarter-wave plate and slow axis of a second quarter-wave plate that perpendicularly intersect each other in the front, as viewed from a front direction (upper) and as viewed obliquely at a 0-degree orientation (lower).
Figure 2:
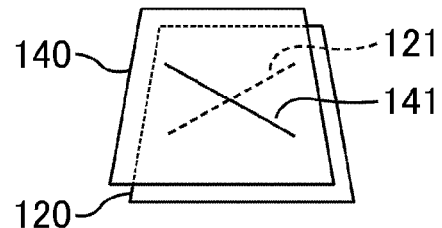
Figure 2:
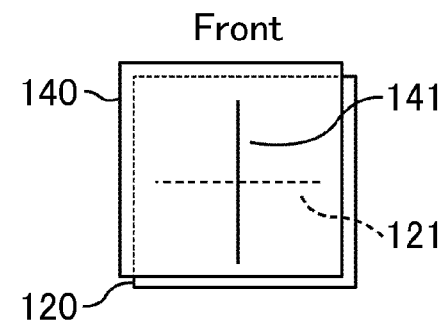
Figure 2:
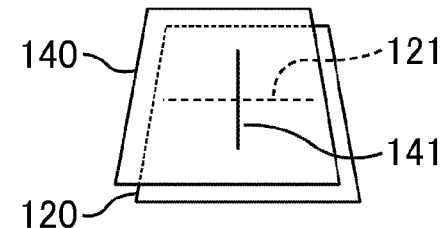
Figure 2:
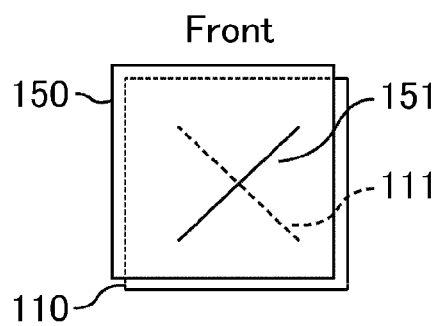
Figure 2:
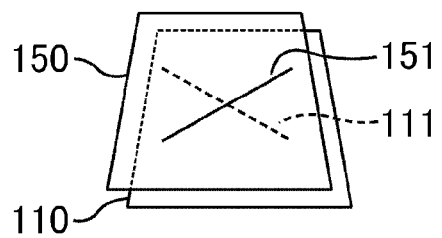
Figure 3:
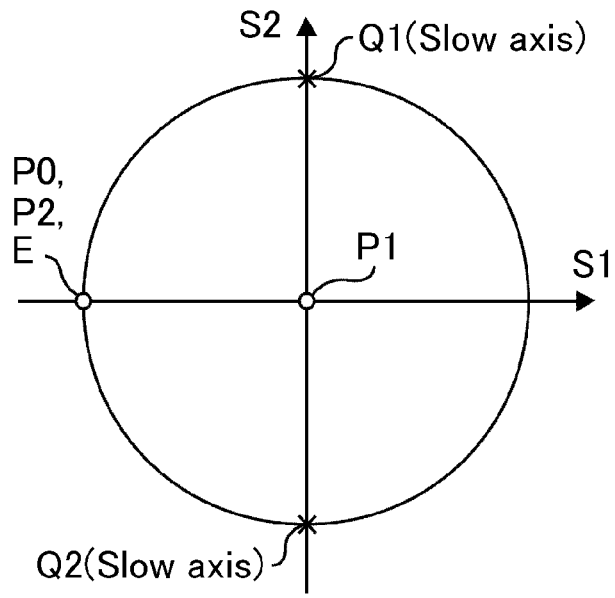
[FIG. 3]
Figure 4:
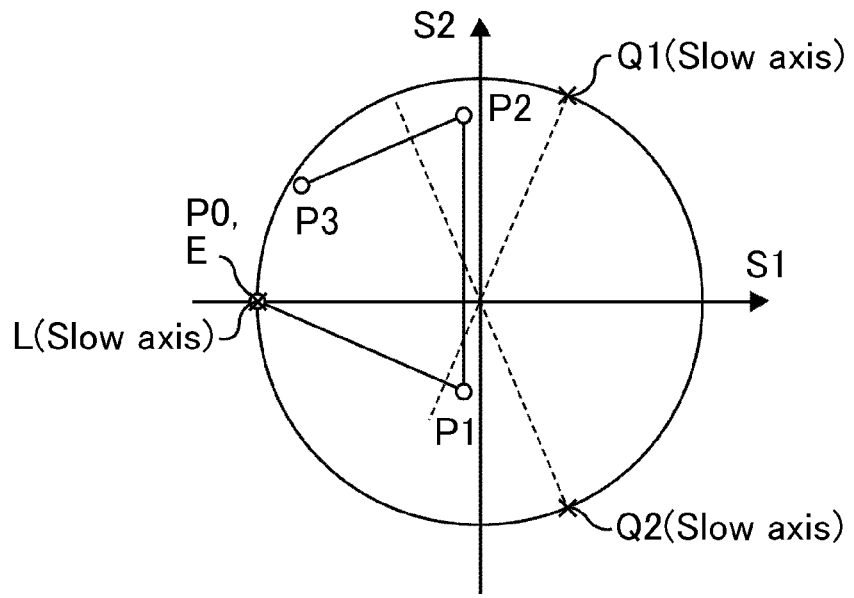
[FIG. 4]
Figure 5:
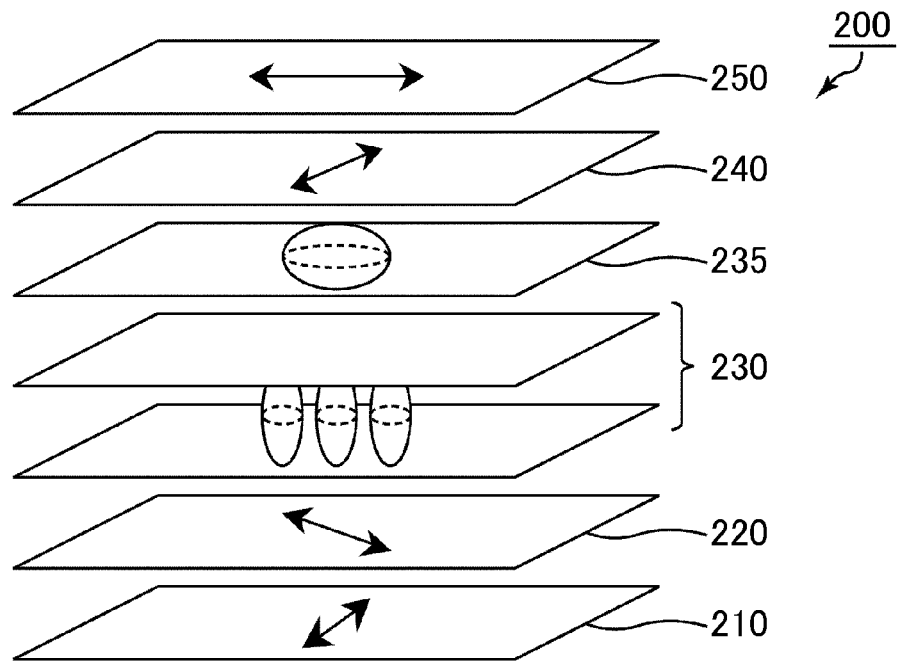
[FIG. 5]
Figure 6:
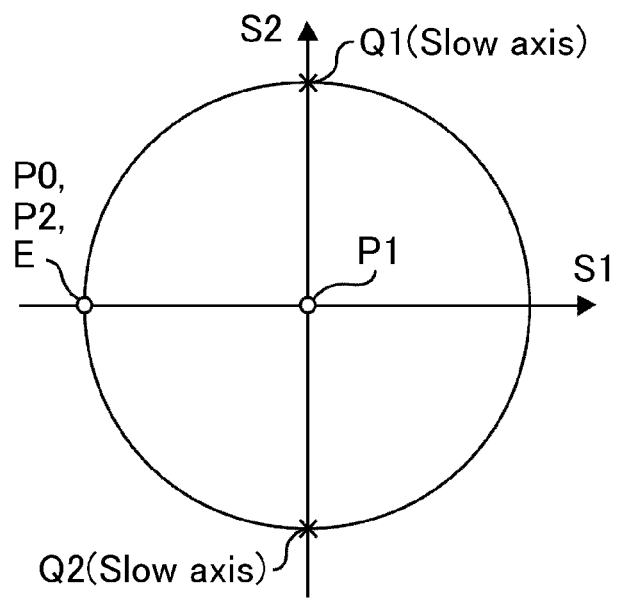
[FIG. 6]
Figure 7:
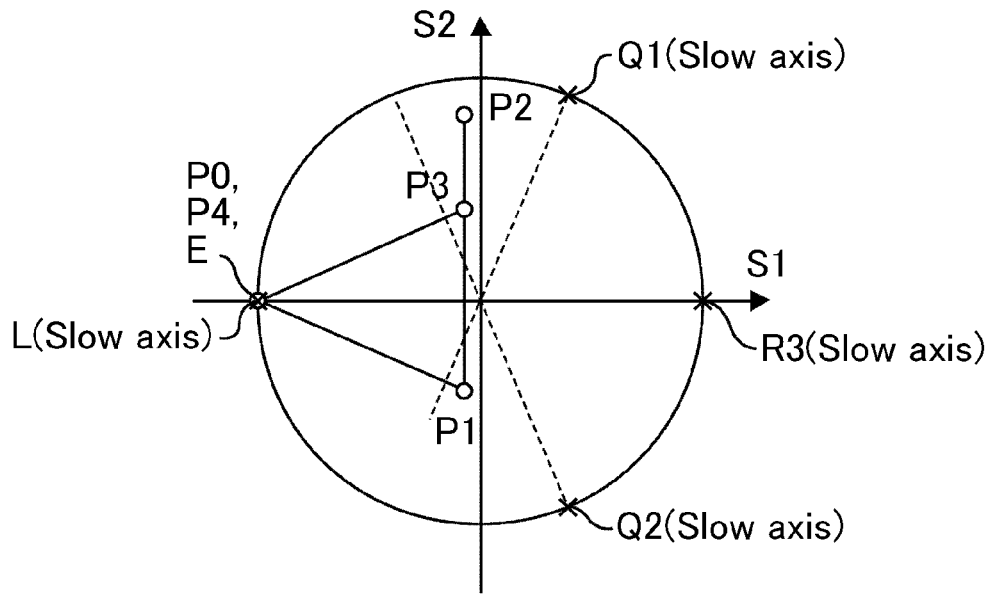
[FIG. 7]
Figure 8:
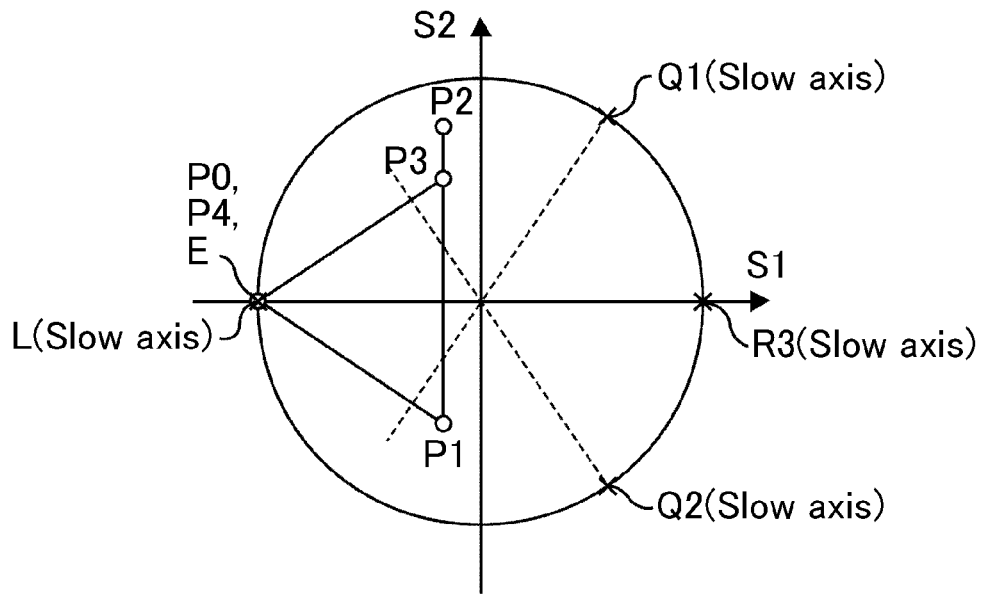
[FIG. 8]
Figure 9:
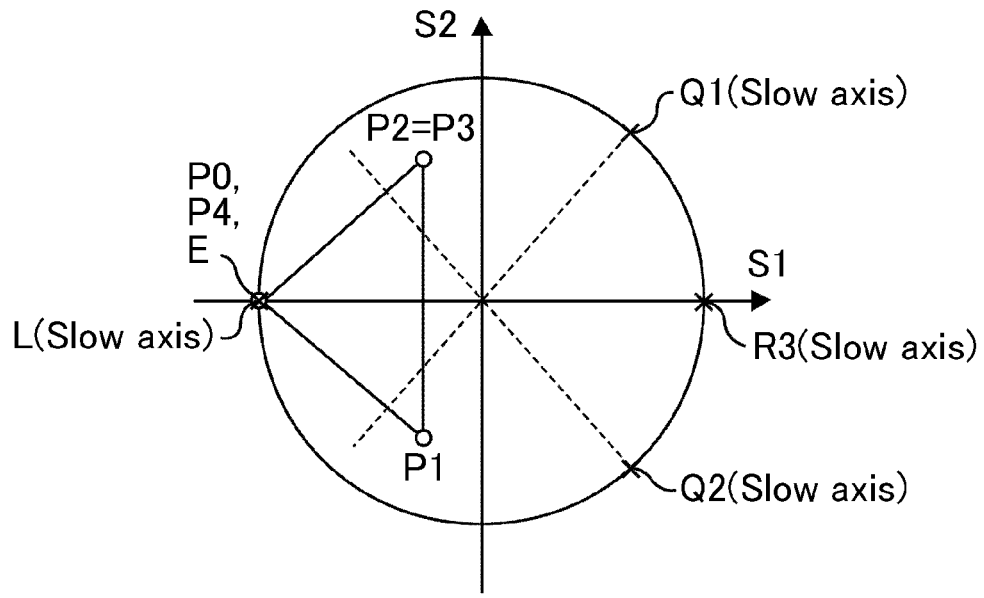
[FIG. 9]
Figure 10:
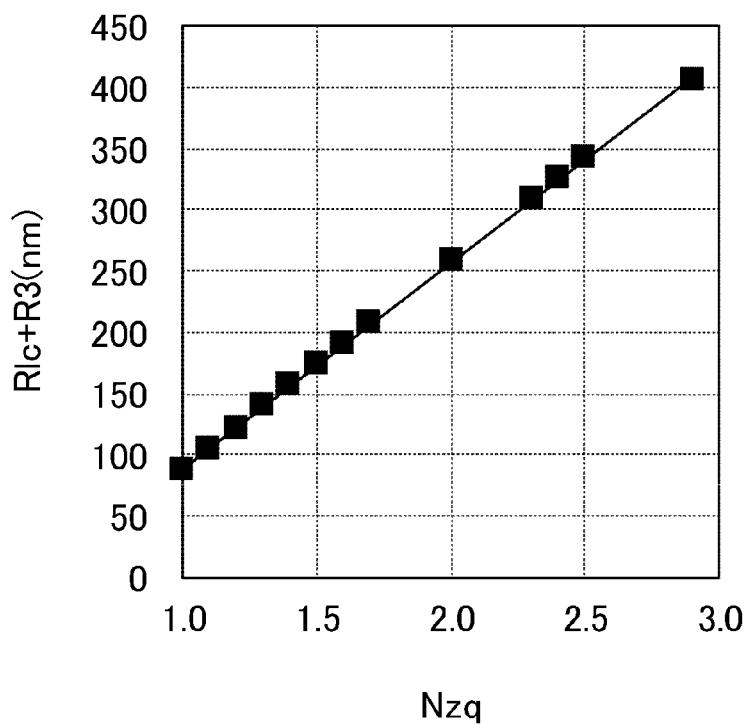
[FIG. 10]
Figure 11:
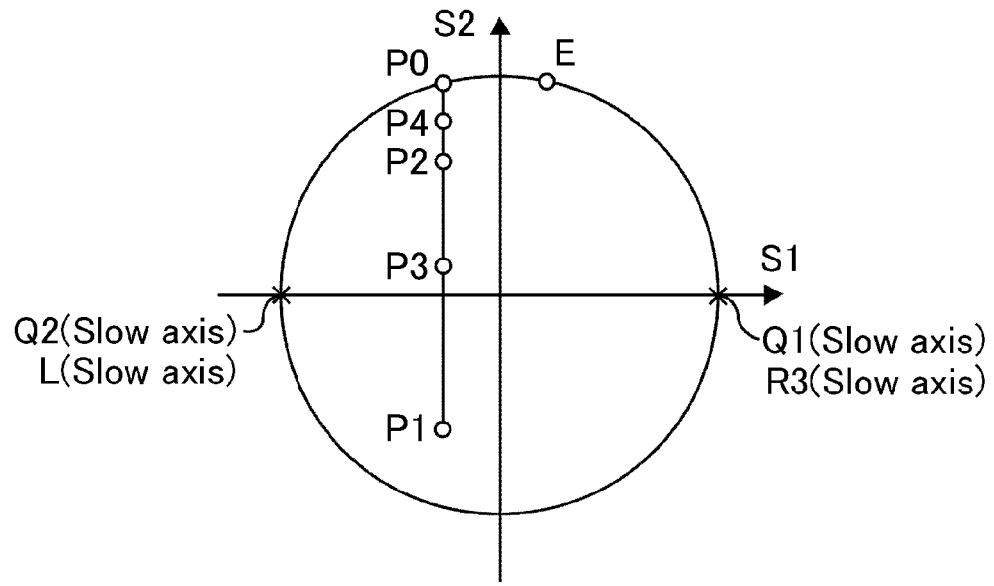
[FIG. 11]
Figure 12:
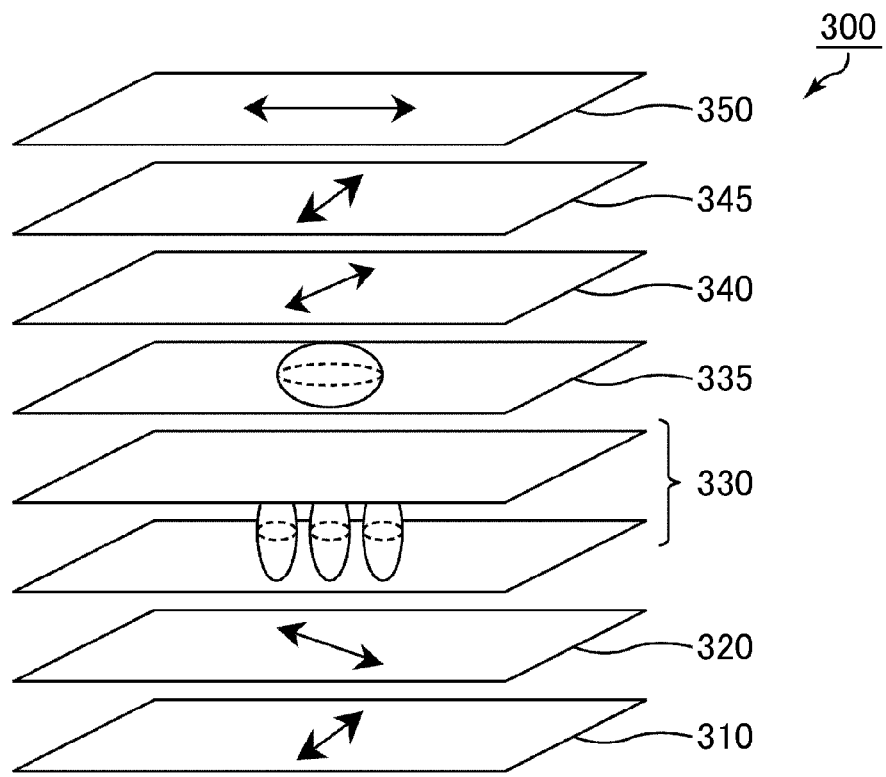
[FIG. 12]
Figure 13:
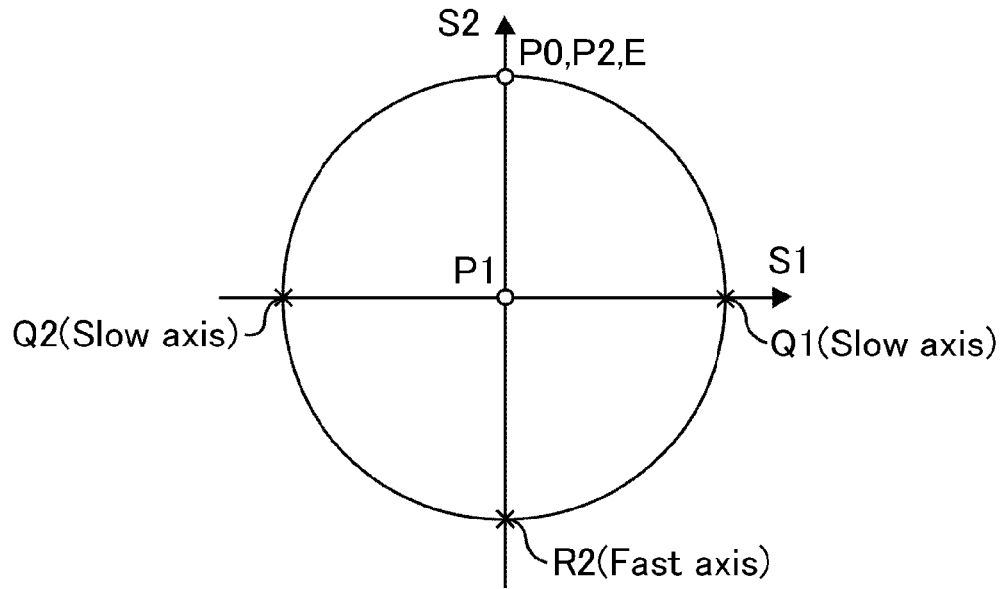
[FIG. 13]
Figure 14:
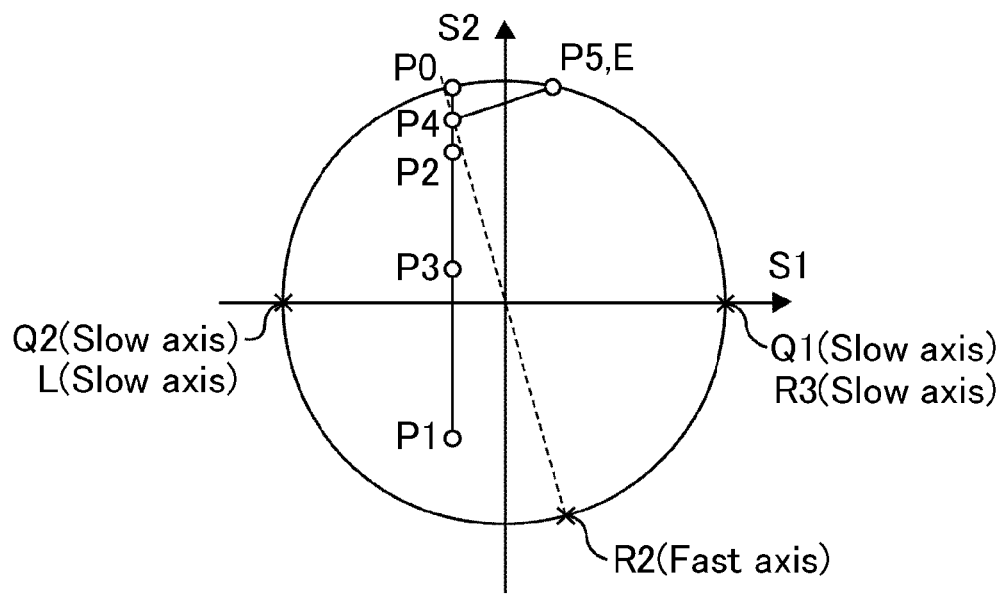
[FIG. 14]
Figure 15:
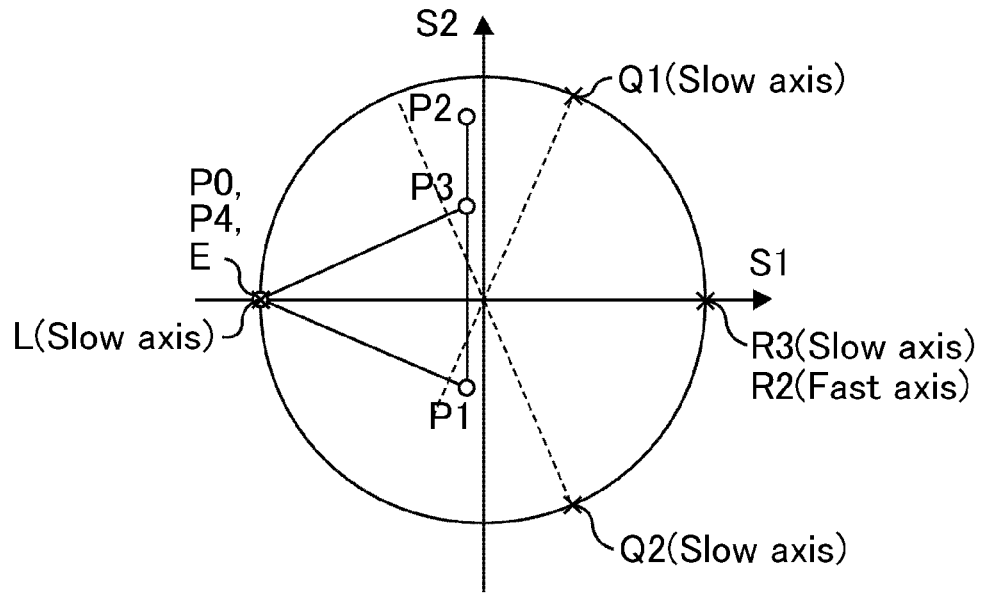
[FIG. 15]
Figure 16:
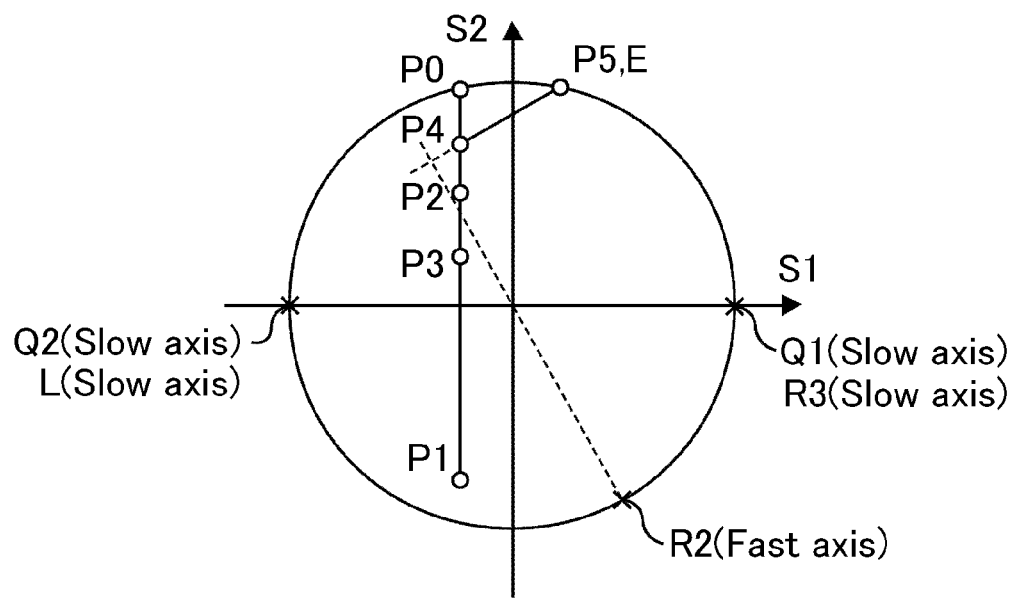
[FIG. 16]
Figure 17:
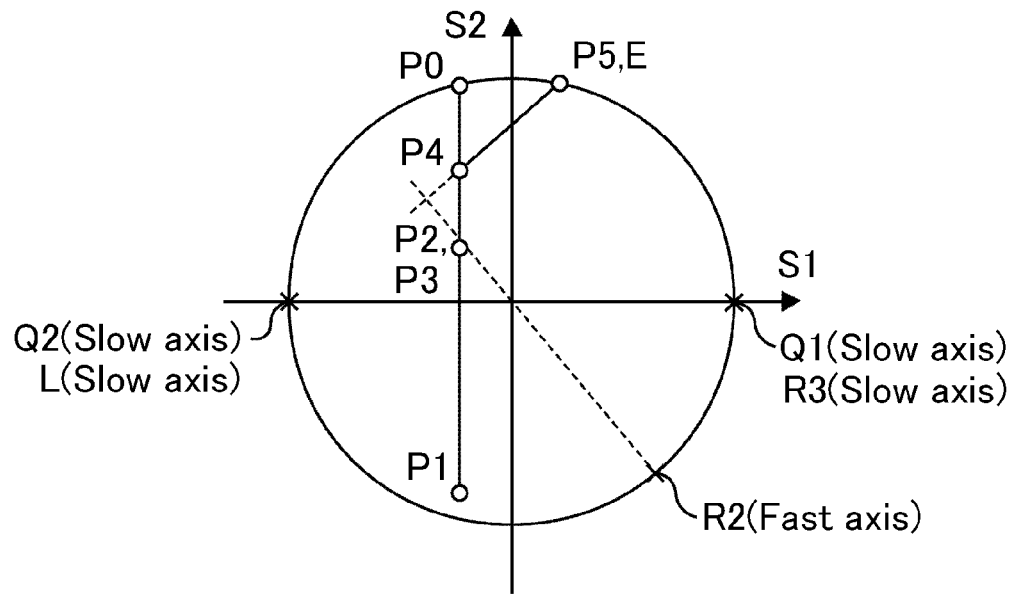
[FIG. 17]
Figure 18:
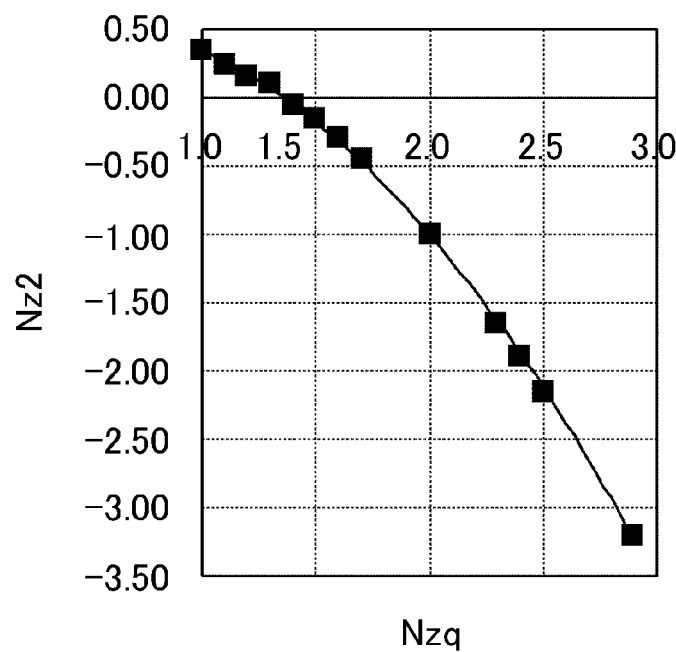
[FIG. 18]
Figure 19:
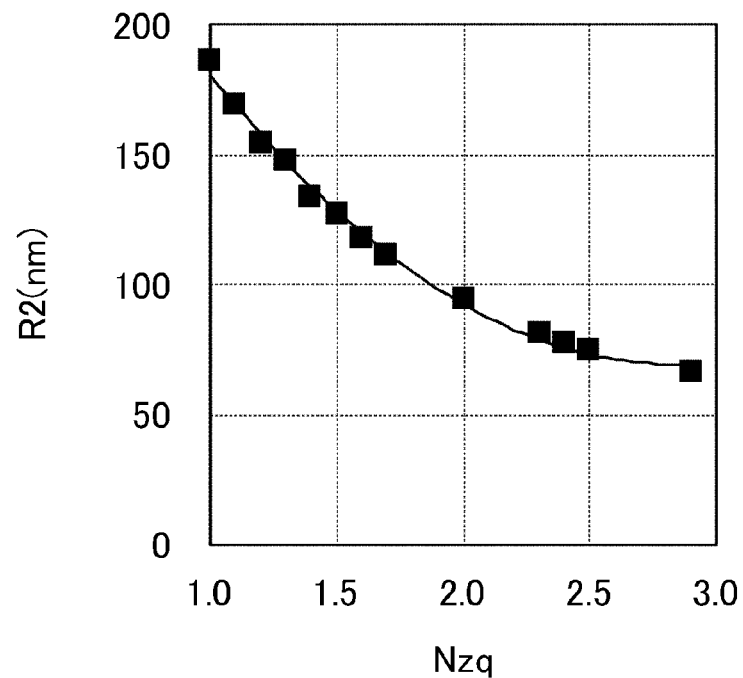
[FIG. 19]
Figure 26:
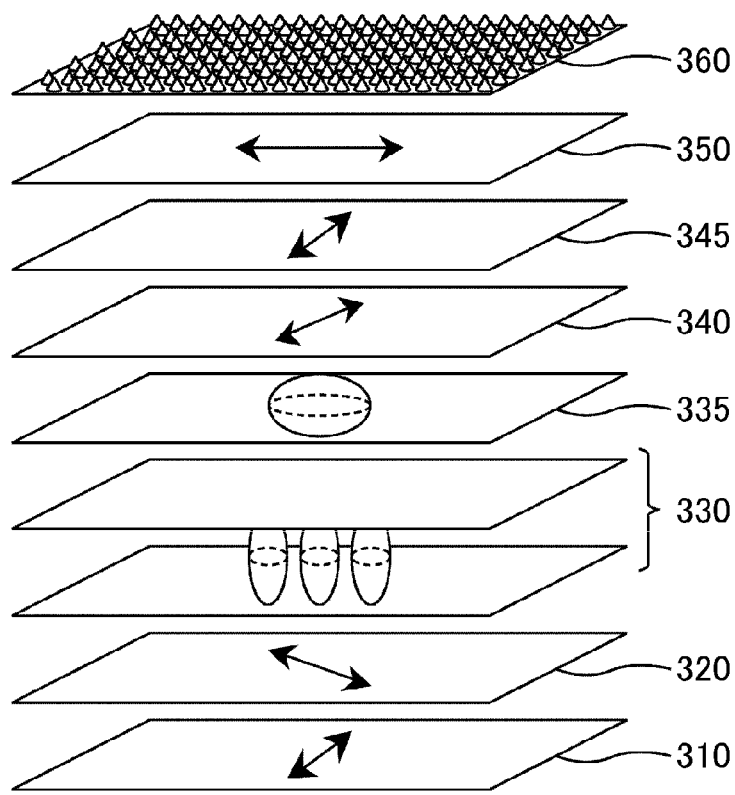
[FIG. 26]

The moth-eye film offers the effect of reducing reflectance if placed at an interface at which the refractive index changes, but with the configuration shown in FIG. 12, internal reflection occurring on the inner side of the second polarizer 350 can be reduced by a circularly polarizing plate made up of a combination of the second polarizer 350 and second quarter-wave plate 340. Therefore, when added to the configuration in FIG. 12, the moth-eye film is placed closer to the display surface than is the second polarizer 350, as in the case of a moth-eye film 360 shown in FIG. 26. When members such as a protective plate are placed closer to the display surface than is the second polarizer 350, forming multiple interfaces, a moth-eye film may be provided at each interface, and preferably a moth-eye film is placed at least on a surface (display surface) exposed outside the liquid-crystal display device.

Figure 20:
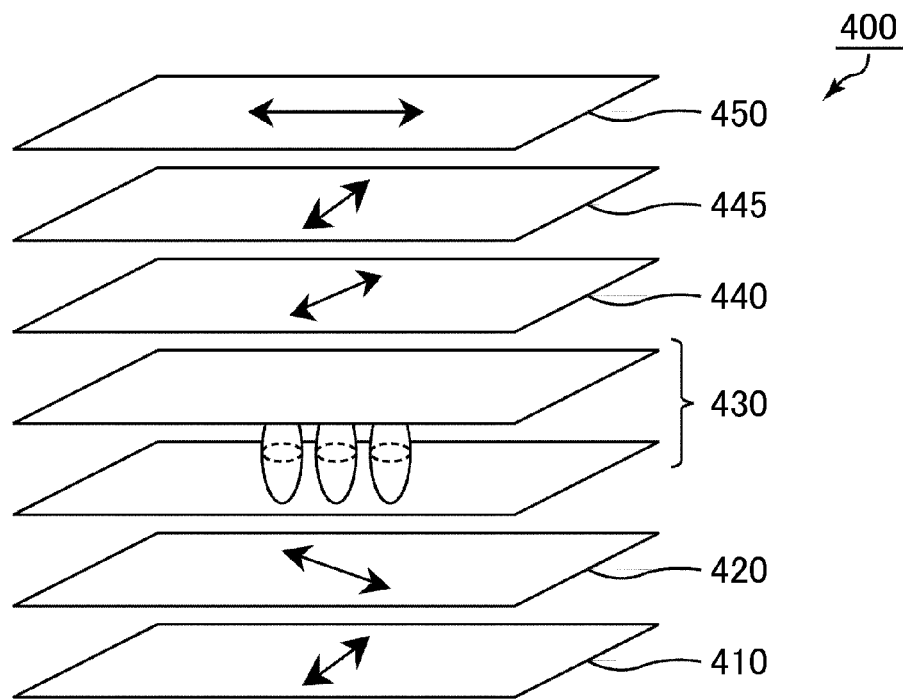
[FIG. 20]
Figure 27:
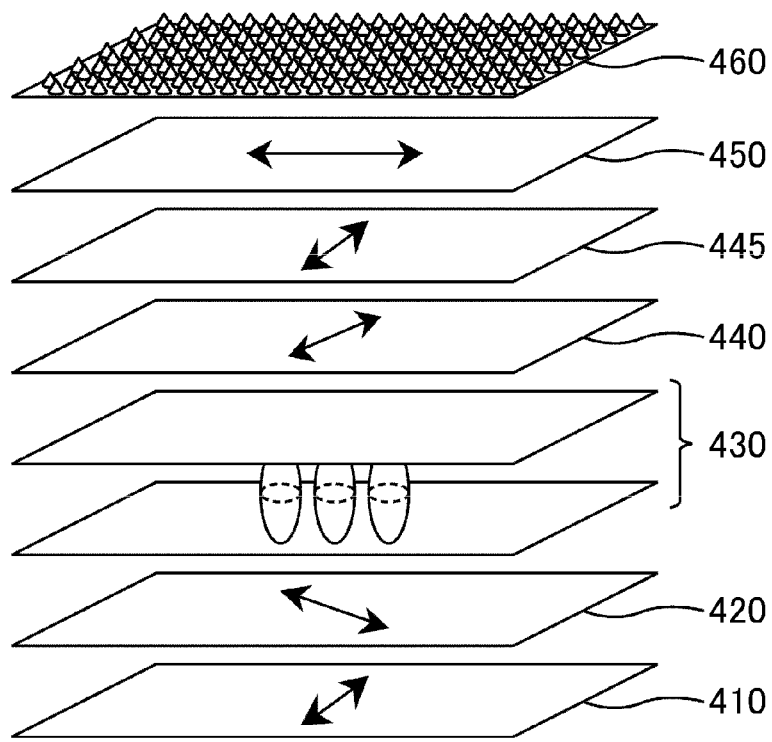
[FIG. 27]

Similarly, when added to the configuration in FIG. 20, the moth-eye film is placed closer to the display surface than is the second polarizer 450, as in the case of a moth-eye film 460 shown in FIG. 27. When members such as a protective plate are placed closer to the display surface than is the second polarizer 450, forming multiple interfaces, a moth-eye film may be provided at each interface, and preferably a moth-eye film is placed at least on a surface exposed outside the liquid-crystal display device.

Concrete examples of moth-eye film include a resin film on whose surface a large number of substantially cone-shaped projections approximately 200 nm high are formed at peak-to-peak intervals of approximately 200 nm.

Available methods for manufacturing moth-eye film include a so-called nano-imprint technique that involves transferring nanometer-size asperities (1 to 1000 μm) cut in a die to a resin material applied to a substrate, by pressing the die against the substrate. Available methods for hardening the resin material in the nano-imprint technique include a thermal nano-imprint technique and UV nano-imprint technique. The UV nano-imprint technique involves forming a thin film of ultraviolet-curing resin on a transparent substrate, pressing a die against the thin film, irradiating the thin film with ultraviolet rays, and thereby forming a thin film having a moth-eye structure that is a negative shape of the die on the transparent substrate.

In order to produce thin film with a moth-eye structure in large quantities at low cost by the nano-imprint technique, roll-to-roll processing is more suitable than batch processing. The roll-to-roll processing allows thin film with a moth-eye structure to be produced continuously using die rolls. Examples of such die rolls include rolls produced by forming nanometer-size depressions on an outer circumferential surface of a ground columnar or cylindrical aluminum tube by an anodic oxidation process. The anodic oxidation process allows nanometer-size depressions to be formed on a surface almost uniformly on a random basis, making it possible to form a seamless moth-eye structure suitable for continuous production on the surface of a die roll.

The aforementioned modes of the embodiments may be employed in appropriate combination as long as the combination is not beyond the spirit of the present invention.

The present application claims priority to Patent Application No. 2009-233704 filed in Japan on Oct. 7, 2009 under the Paris Convention and provisions of national law in a designated State, the entire contents of which are hereby incorporated by reference.

REFERENCE SIGNS LIST 1r, 1f: Transparent substrate
2R, 2G, 2B, 22R, 22G, 22B, 32R, 32G, 32B: Color filter layer
3, 23, 33: Liquid crystal layer
11: First polarizer
12: First quarter-wave plate
10, 20, 30: VA liquid crystal cell
13: Third-class birefringent layer
14: Second quarter-wave plate
15: Second-class birefringent layer
16: Second polarizer
100: Circularly polarized VA liquid-crystal display device
110: First polarizer
111: Absorption axis of first polarizer
120: First quarter-wave plate
121: Slow axis of first quarter-wave plate
130: VA liquid crystal cell
140: Second quarter-wave plate
141: Slow axis of second quarter-wave plate
150: Second polarizer
151: Absorption axis of second polarizer
200: Circularly polarized VA liquid-crystal display device
210: First polarizer
220: First quarter-wave plate
230: VA liquid crystal cell
235: Third-class birefringent layer
240: Second quarter-wave plate
250: Second polarizer
300: Circularly polarized VA liquid-crystal display device
310: First polarizer
320: First quarter-wave plate
330: VA liquid crystal cell
335: Third-class birefringent layer
340: Second quarter-wave plate
345: Second-class birefringent layer
350: Second polarizer
360: Moth-eye film
361: Projection
362: Film base
400: Circularly polarized VA liquid-crystal display device
410: First polarizer
420: First quarter-wave plate
430: VA liquid crystal cell
440: Second quarter-wave plate
445: Second-class birefringent layer
450: Second polarizer
460: Moth-eye film

The invention claimed is:
1. A liquid-crystal display device,
in which a birefringent layer that satisfies the relationship nx>ny≥nz is defined as a first-class birefringent layer,
a birefringent layer that satisfies the relationship nx<ny≤nz is defined as a second-class birefringent layer, and a birefringent layer that satisfies the relationship nx≅ny≥nz is defined as a third-class birefringent layer, the liquid-crystal display device comprising:
a first polarizer;
a first first-class birefringent layer whose in-plane phase difference is adjusted to a quarter wave;
a liquid crystal cell provided with a pair of substrates facing each other;
a second first-class birefringent layer whose Nz factor is substantially the same as the first first-class birefringent layer and whose in-plane phase difference is adjusted to a quarter wave;
a second-class birefringent; layer; and
a second polarizer, all of which are stacked in this order,
wherein the liquid-crystal display device comprises no third-class birefringent layer either between the first first-class birefringent layer and the liquid crystal cell or between the liquid crystal cell and the second first-class birefringent layer,
an in-plane slow axis of the first first-class birefringent layer is at an angle of substantially 45° to an absorption axis of the first polarizer,
an in-plane slow axis of the second first-class birefringent layer is substantially orthogonal to the in-plane slow axis of the first first-class birefringent layer,
an absorption axis of the second polarizer is substantially orthogonal to the absorption axis of the first polarizer,
an in-plane fast axis of the second-class birefringent layer is substantially orthogonal to the absorption axis of the second polarizer, and
the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (1) and (2) below:

$$Rth\_all(B)/Rth\_all(G) > \Delta n\_LC(B)/\Delta n\_LC(G) \quad (1)$$

$$Rth\_all(R)/Rth\_all(G) < \Delta n\_LC(R)/\Delta n\_LC(G) \quad (2)$$

where Rth_all(B), Rth_all(G), and Rth_all(R) represent perpendicular phase difference of the liquid crystal cell at wavelengths of 450 nm, 550 nm, and 650 nm, respectively; and Δn_LC(B), Δn_LC(G), and Δn_LC(R) represent birefringence values of a liquid crystal material of the liquid crystal layer at wavelengths of 450 nm, 550 nm, and 650 nm, respectively.

2. The liquid-crystal display device according to claim 1, wherein at least one of d(R), d(G), and d(B) differs from the others, d(R), d(G), and d(B) respectively denoting thickness of the liquid crystal layer in regions where the blue, green, and red color filter layers are provided.

3. The liquid-crystal display device according to claim 1, wherein at least one of Rtf_cf(R), Rth_cf(G), and Rth_cf(B) differs from the others, Rth_cf(R) being perpendicular phase difference of the red color filter layer at a wavelength of 650 nm, Rth_cf(G) being perpendicular phase difference of the green color filter layer at a wavelength of 550 nm, Rth_cf(B) being perpendicular phase difference of the blue color filter layer at a wavelength of 450 nm.

4. The liquid-crystal display device according to claim 1, wherein
the liquid-crystal display device satisfies expressions (3), (10), and (11) below:

$$1.0 \le Nzq \le 2.9 \quad (3)$$

$$(169 \text{ nm} \times Nzq - 81 \text{ nm}) - 30 \text{ nm} \le Rlc \quad (10)$$

$$Rlc \le (169 \text{ nm} \times Nzq - 81 \text{ nm}) + 30 \text{ nm} \quad (11).$$

wherein Nzq denotes the Nz factor of the first and second first-class birefringent layers, and
Rlc denotes perpendicular phase difference of the liquid crystal cell during black display.

5. The liquid-crystal display device according to claim 4, wherein
the liquid-crystal display device satisfies experssions (6) to (9) below:

$$(-0.63 \times Nzq^2 + 0.56 \times Nzq + 0.40) - 0.35 \le Nz2 \quad (6)$$

$$Nz2 \le (-0.63 \times Nzq^2 + 0.56 \times Nzq + 0.40) + 0.35 \quad (7)$$

$$(43 \text{ nm} \times Nzq^2 - 226 \text{ nm} \times Nzq + 370 \text{ nm}) - 30 \text{ nm} \le R2 \quad (8)$$

$$R2 \le (43 \text{ nm} \times Nzq^2 - 226 \text{ nm} \times Nzq + 370 \text{ nm}) + 30 \text{ nm} \quad (9).$$

wherein Nz2 denotes an Nz factor of the second-class birefringent layer, and
R2 denotes an in-plane phase difference of the second-class birefringent layer.

6. The liquid-crystal display device according to claim 5, wherein the liquid-crystal display device satisfies $1.40 \le Nzq$.

7. The liquid-crystal display device according to claim 1, wherein
the liquid-crystal display device satisfies $Nzq < 1.40$, $-0.35 \le Nz2 \le 0$, and $108 \text{ nm} \le R2 \le 168 \text{ nm}$, Nzq denoting the Nz factor of the first and second first-class birefringent layers, Nz2 denoting an Nz factor of the second-class birefringent layer, R2 denoting an in-plane phase difference of the second-class birefringent layer.

8. The liquid-crystal display device according to claim 1, wherein
the liquid-crystal dislplay device satisfies $2.00 \le Nzq$, Nzq denoting the Nz factor of the first and second first-class birefringent layers.

9. The liquid-crystal display device according to claim 1, further comprising a moth-eye film, wherein
the moth-eye film is placed on a display surface exposed outside the liquid-crystal display device.

10. A liquid-crystal display device,
in which a birefringent layer that satisfies the relationship nx>ny≥nz is defined as a first-class birefringent layer, and
a birefringent layer that satisfies the relationship nx<ny≤nz is defined as a second-class birefringent layer, the liquid-crystal display device comprising:
a first polarizer;
a first first-class birefringent layer whose in-plane phase difference is adjusted to a quarter wave;
a liquid crystal cell provided with a pair of substrates facing each other;
a second first-class birefringent layer whose Nz factor is substantially the same as the first first-class birefringent layer and whose in-plane phase difference is adjusted to a quarter wave;
a second-class birefringent layer; and
a second polarizer, all of which are stacked in this order,
wherein an in-plane slow axis of the first first-class birefringent layer is at an angle of substantially 45° to an absorption axis of the first polarizer, an in-plane slow axis of the second first-class birefringent layer is substantially orthogonal to the in-plane slow axis of the first first-class birefringent layer, an absorption axis of the second polarizer is substantially orthogonal to the absorption axis of the first polarizer, an in-plane fast axis of the second-class birefringent layer is substantially orthogonal to the absorption axis of the second polarizer, and the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (12) and (13) below:

$$Rth\_c(B)/Rth\_c(G) > \Delta n\_LC(B)/\Delta n\_LC(G) \tag{12}$$

$$Rth\_c(R)/Rth\_c(G) < \Delta n\_LC(R)/\Delta n\_LC(G) \tag{13}$$

where $Rth\_c(B)$, $Rth\_c(G)$, and $Rth\_c(R)$ represents perpendicular phase difference of the liquid crystal cell at wavelengths of 450 nm, 550 nm, and 650 nm, respectively, and $\Delta n\_LC(B)$, $\Delta n\_LC(G)$, and $\Delta n\_LC(R)$ represent birefringence values of a liquid crystal material of the liquid crystal layer at wavelengths of 450 nm, 550 nm, and 650 nm, respectively.

11. A liquid-crystal display device, in which a birefringent layer that satisfies the relationship nx>ny≥nz is defined as a first-class birefringent layer, a birefringent layer that satisfies the relationship nx<ny≤nz is defined as a second-class birefringent layer, and a birefringent layer that satisfies the relationship nx≡ny≥nz is defined as a third-class birefringent layer, the liquid-crystal display device comprising:

a first polarizer;

a first first-class birefringent layer whose in-plane phase difference is adjusted to a quarter wave;

a liquid crystal cell provided with a pair of substrates facing each other;

a second first-class birefringent layer whose Nz factor is substantially the same as the first first-class birefringent layer and whose in-plane phase difference is adjusted to a quarter wave;

a second-class birefringent layer; and a second polarizer, all of which are stacked in this order, wherein the liquid-crystal display device comprises at least one third-class birefringent layer at least one of between the first first-class birefringent layer and the liquid crystal cell and between the liquid crystal cell and the second first-class birefringent layer, an in-plane slow axis of the first first-class birefringent layer is at an angle of substantially 45° to an absorption axis of the first polarizer, an in-plane slow axis of the second first-class birefringent layer is substantially orthogonal to the in-plane slow axis of the first first-class birefringent layer, an absorption axis of the second polarizer is substantially orthogonal to the absorption axis of the first polarizer, an in-plane fast axis of the second-class birefringent layer is substantially orthogonal to the absorption axis of the second polarizer, and the liquid crystal cell is a vertically aligned liquid crystal cell that has a liquid crystal layer and color filter layers between the pair of substrates, the color filter layers including at least blue, green, and red color filter layers adapted to separate any color of blue, green, and red, respectively, and the liquid crystal cell being configured to satisfy at least one of expressions (14) and (15) below:

$$Rth\_t(B)/Rth\_t(G) < \Delta n\_LC(B)/\Delta n\_LC(G) \tag{14}$$

$$Rth\_t(R)/Rth\_t(G) > \Delta n\_LC(R)/\Delta n\_LC(G) \tag{15}$$

where $Rth\_t(B)$, $Rth\_t(G)$, and $Rth\_t(R)$ respectively represent sums of perpendicular phase difference of the liquid crystal cell at wavelengths of 450 nm, 550 nm, and 650 nm and the perpendicular phase difference of the third-class birefringent layer at wavelengths of 450 nm, 550 nm, and 650 nm while $\Delta n\_LC(B)$, $\Delta n\_LC(G)$, and $\Delta n\_LC(R)$ represent birefringence values of a liquid crystal material of the liquid crystal layer at wavelengths of 450 nm, 550 nm, and 650 nm, respectively.

* * * * *